(12) United States Patent
Akbar Attar et al.

(10) Patent No.: US 7,734,262 B2
(45) Date of Patent: Jun. 8, 2010

(54) METHOD AND APPARATUS FOR REVERSE LINK THROTTLING IN A MULTI-CARRIER WIRELESS COMMUNICATION SYSTEM

(76) Inventors: Rashid Ahmed Akbar Attar, 14724 Via Mantova #3112, San Diego, CA (US) 92127; Donna Ghosh, 10928 Caminito Allvarez, San Diego, CA (US) 92126; Christopher Gerard Lott, 3783 Balboa Ter., #C, San Diego, CA (US) 92117; Naga Bhushan, 7794 Roan Rd., San Diego, CA (US) 92129

( * ) Notice: Subject to any disclaimer, the term of this patent is extended or adjusted under 35 U.S.C. 154(b) by 523 days.

(21) Appl. No.: 11/487,182

(22) Filed: Jul. 13, 2006

(65) Prior Publication Data

US 2007/0015476 A1 Jan. 18, 2007

Related U.S. Application Data

(60) Provisional application No. 60/700,532, filed on Jul. 18, 2005.

(51) Int. Cl.
*H04B 1/04* (2006.01)

(52) U.S. Cl. ............... 455/127.1; 455/522; 455/69; 455/561; 455/437; 455/442; 370/321; 370/337; 370/317; 370/208

(58) Field of Classification Search ............ 455/127.1, 455/522, 69, 561, 67.3, 442, 437, 67.13; 370/321, 337, 317, 208
See application file for complete search history.

(56) References Cited

U.S. PATENT DOCUMENTS 6,594,501 B2 7/2003 Black

| | | | |
|---|---|---|---|
| 2003/0058811 A1* | 3/2003 | Shurvinton | 370/321 |
| 2004/0252658 A1 | 12/2004 | Hosein et al. | |
| 2005/0059421 A1 | 3/2005 | Reed et al. | |
| 2005/0147022 A1 | 7/2005 | Hosur et al. | |

FOREIGN PATENT DOCUMENTS

| | | |
|---|---|---|
| TW | 535378 | 7/2001 |
| TW | 514772 | 12/2002 |
| TW | 200503456 | 1/2005 |
| WO | 0124568 | 4/2001 |
| WO | 01058046 | 8/2001 |

OTHER PUBLICATIONS

International Search Report—PCT/US2006/027968, International Search Authority—European Patent Office—Nov. 24, 2006.
Written Opinion—PCT/US2006/027968, International Search Authority—European Patent Office—Nov. 24, 2006.
International Preliminary Report on Patentability—PCT/US2006/027968, International Bureau of WIPO—Geneva, Switzerland—Jan. 22, 2008.

* cited by examiner

*Primary Examiner*—Sanh D Phu

(57) ABSTRACT

In one embodiment, the patent application comprises an access terminal, comprising a processing unit, a memory operably connected to the processing unit, a receive circuitry operably connected to the processing unit, a transmit circuitry having a power amplifier used in both single carrier and multi-carrier operations, wherein said transmit circuitry is operably connected to the processing unit, and a throttle control unit operably connected to the power amplifier, adapted to throttle power to provide sufficient headroom for the power amplifier.

52 Claims, 29 Drawing Sheets

METHOD AND APPARATUS FOR REVERSE LINK THROTTLING IN A MULTI-CARRIER WIRELESS COMMUNICATION SYSTEM

CLAIM OF PRIORITY UNDER 35 U.S.C. §119

This application claims benefit of U.S. Provisional Application titled "Method and Apparatus for Reverse Link Throttling in a Multi-Carrier Wireless Communication System," U.S. application Ser. No. 60/700,532, filed Jul. 18, 2005, and assigned to the assignee hereof and hereby expressly incorporated by reference herein.

BACKGROUND

1. Field

The present application for patent relates generally to multi-carrier wireless communication systems, and more specifically to reverse link power throttling.

2. Background

Communication systems 100 may use a single carrier frequency or multiple carrier frequencies. In wireless communication systems 100, the forward link refers to communications from the access network (AN) 120 to the remote station 106 (or access terminal 106), while reverse link refers to communications from the remote station 106 to the network 120. (The AT 106 is also known as a remote station, a mobile station or a subscriber station. Also, the access terminal (AT) 106, may be mobile or stationary). Each link may incorporate a different number of carrier frequencies. An example of a cellular communication system 100 is shown in FIG. 1A where reference numerals 102A to 102G refer to cells, reference numerals 160A to 160G refer to base stations and reference numerals 106A to 106G refer to access terminals.

The communication system 100 may be a code division multiple access (CDMA) system having a high data rate (HDR) overlay system, such as specified in the HDR standard. The AN 120 communicates with an AT, as well as any other ATs 106 within system, by way of the air interface. The AN 120 includes multiple sectors, wherein each sector provides at least one channel. A channel is defined as the set of communication links for transmissions between the AN 120 and the ATs 106 within a given frequency assignment. A channel consists of a forward link and a reverse link.

A high data rate subscriber station 106 may communicate with one or more HDR base stations 160, referred to herein as modem pool transceivers (MPTs) 160 via an air interface. An access terminal 106 transmits and receives data packets through one or more modem pool transceivers 160 to an HDR base station controller 130, referred to herein as a modem pool controller (MPC) 130. Modem pool transceivers 160 and modem pool controllers 130 are parts of the access network (AN) 120. The access network 120 may be further connected to additional networks 104 outside the access network 120, such as a corporate intranet or the Internet, and may transport data packets between each access terminal 106 and such outside networks. An access terminal 106 that has established an active traffic channel connection with one or more modem pool transceivers 160 is called an active access terminal 106, and is said to be in a traffic state. An access terminal 106 that is in the process of establishing an active traffic channel connection with one or more modem pool transceivers 130 is said to be in a connection setup state. An access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone. The communication link through which the access terminal 106 sends signals to the modem pool transceiver 160 is called a reverse link. The communication link through which a modem pool transceiver 160 sends signals to an access terminal 106 is called a forward link.

FIG. 1B is a simplified functional block diagrams of an exemplary CDMA communications system. A base station controller 130 can be used to provide an interface between a network 104 and all base stations 160 dispersed throughout a geographic region. For ease of explanation, only one base station 160 is shown. The geographic region is generally subdivided into smaller regions known as cells 102. Each base station 160 is configured to serve all subscriber stations 106 in its respective cell. In some high traffic applications, the cell 102 may be divided into sectors with a base station 160 serving each sector. In the described exemplary embodiment, three subscriber stations 106A-C are shown in communication with the base station 160. Each subscriber station 106A-C may access the network 104, or communicate with other subscriber stations 106, through one or more base stations 160 under control of the base station controller 130.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

In multi-access communications systems, techniques to reduce mutual interference between multiple users are often utilized to increase user capacity. By way of example, power control techniques can be employed to limit the transmission power of each user to that necessary to achieve a desired quality of service. This approach ensures that each user transmits only the minimum power necessary, but no higher, thereby making the smallest possible contribution to the total noise seen by other users. These power control techniques may become more complex in multi-access communications systems supporting users with multiple channel capability. In addition to limiting the transmission power of the user, the allocated power should be balanced between the multiple channels in a way that optimizes performance.

A power control system can be employed to reduce mutual interference between the multiple subscriber stations 106. The power control system can be used to limit the transmission power over both the forward and reverse links to achieve a desired quality of service. For the purposes of illustration, the gain computation techniques will be described with reference to the reverse link, however, as those skilled in the art will readily appreciate, these gain computation techniques are equally applicable to the forward link.

The reverse link transmission power is typically controlled with two power control loops. The first power control loop is an open control loop. The open control loop is designed to control the reverse link transmission power as a function of path loss, the effect of base station 160 loading, and environmentally induced phenomena such as fast fading and shadowing. This open control loop estimation process is well known in CDMA communications systems.

The second power control loop is a closed control loop. The closed control loop has the function of correcting the open loop estimate to achieve a desired signal-to-noise ratio (SNR) at the base station 160. This can be achieved by measuring the reverse link transmission power at the base station 160 and providing feedback to the subscriber station 106 to adjust the reverse link transmission power. The feedback signal can be in the form of a reverse power control (RPC) command which is generated by comparing the measured reverse link transmission power at the base station 160 with a power control set point. If the measured reverse link transmission power is below the set point, then an RPC up command is provided to the subscriber station 106 to increase the reverse link transmission power. If the measured reverse link transmission power is above the set point, then an RPC down command is provided to the subscriber station 106 to decrease the reverse link transmission power.

The open and closed control loops may be used to control the transmission power of various reverse link channel structures. By way of example, in some CDMA communications systems, the reverse link waveform includes a traffic channel to carry voice and data services to the base station 160 and a pilot channel used by the base station 160 for coherent demodulation of the voice and data. In these systems, the open and closed control loops can be used to control the reverse link power of the pilot channel. In order to optimize performance, the power of the pilot channel can then be balanced with the power of the traffic channel. Specifically, each channel can be spread with a unique orthogonal code generated by using Walsh functions. A gain can then be applied to the traffic channel in order to maintain an optimal traffic to pilot channel power ratio.

This principle can be extended to additional channels in the reverse link waveform. In CDMA communications systems with a variable data rate, for example, a data rate control (DRC) channel containing a DRC message is generally supported by the reverse link transmission. In the variable data rate mode, the data rate of the forward link transmission is dictated by the DRC message. The DRC message is typically based on a carrier-to-interference (C/I) estimation performed at the subscriber station 106. This approach provides a mechanism for the base station 160 to efficiently transmit the forward link data at the highest possible rate. An exemplary CDMA communications system supporting a variable data rate request scheme is a high data rate (HDR) communications system. The HDR communications system is typically designed to conform one or more standards such as the "cdma2000 High Rate Packet Data Air Interface Specification," 3GPP2 C.S0024, Version 2, Oct. 27, 2000, promulgated by a consortium called "3.sup.rd Generation Partnership Project."

Open and closed control loops may be used to control the transmission power of various reverse link channel structures. For example, U.S. Pat. No. 6,594,501, entitled "Systems and Techniques for Channel Gain Computations," discloses throttling or backing off predetermined power ratios of the data rate control channels (DRC) and the acknowledgment (ACK) channels with respect to the pilot channel if the total reverse link transmission power exceeds the maximum power capability of the transmitter.

SUMMARY OF THE INVENTION

In view of the above, the described features of the present invention generally relate to one or more improved systems, methods and/or apparatuses for communication speech.

In one embodiment, the patent application comprises an access terminal, comprising a processing unit, a memory operably connected to the processing unit, a receive circuitry operably connected to the processing unit, a transmit circuitry having a power amplifier (PA) used in both single carrier and multi-carrier operations, wherein said transmit circuitry is operably connected to the processing unit, and a throttle control unit operably connected to the power amplifier, adapted to throttle power to provide sufficient headroom for the power amplifier.

In another embodiment, the throttle control unit is further adapted to throttle power over a reverse link having a single carrier, comprising the steps of throttling a data source control (DSC) channel power down to a default level, throttling power for at least one DRC channel on the primary reverse link (RL) carrier until there is sufficient PA headroom or the DRC power has been throttled down, throttling power for at least one ACK channel on the primary reverse link carrier until there is sufficient PA headroom or the ACK power has been throttled down; and throttling one or more of the pilot, data, or reverse rate indicator (RRI) channel powers until there is sufficient headroom.

In another embodiment, the throttle control unit is further adapted to throttle power over a reverse link having multiple carriers, comprising the steps of throttling the power of one primary RL carrier and throttling the power of at least one secondary RL carrier, wherein the step of throttling power of a primary RL carrier comprises the steps of throttling power for a data source control channel down to default level, throttling power for at least one data rate control channel, throttling power for at least one acknowledgment channel, and throttling one or more of pilot, data, or reverse rate indicator channel powers and wherein the step of throttling power of at least one secondary reverse link carrier comprises throttling one or more of pilot, data, or reverse rate indicator channel powers on a first secondary carrier, throttling one or more of the data, or reverse rate indicator channel powers on a second secondary carrier, throttling power for at least one data rate control channel on the second secondary carrier, throttling power for at least one acknowledgement channel on the second secondary carrier; and throttling power for at least one pilot channel on the second secondary carrier.

DETAILED DESCRIPTION

Figure 1A:
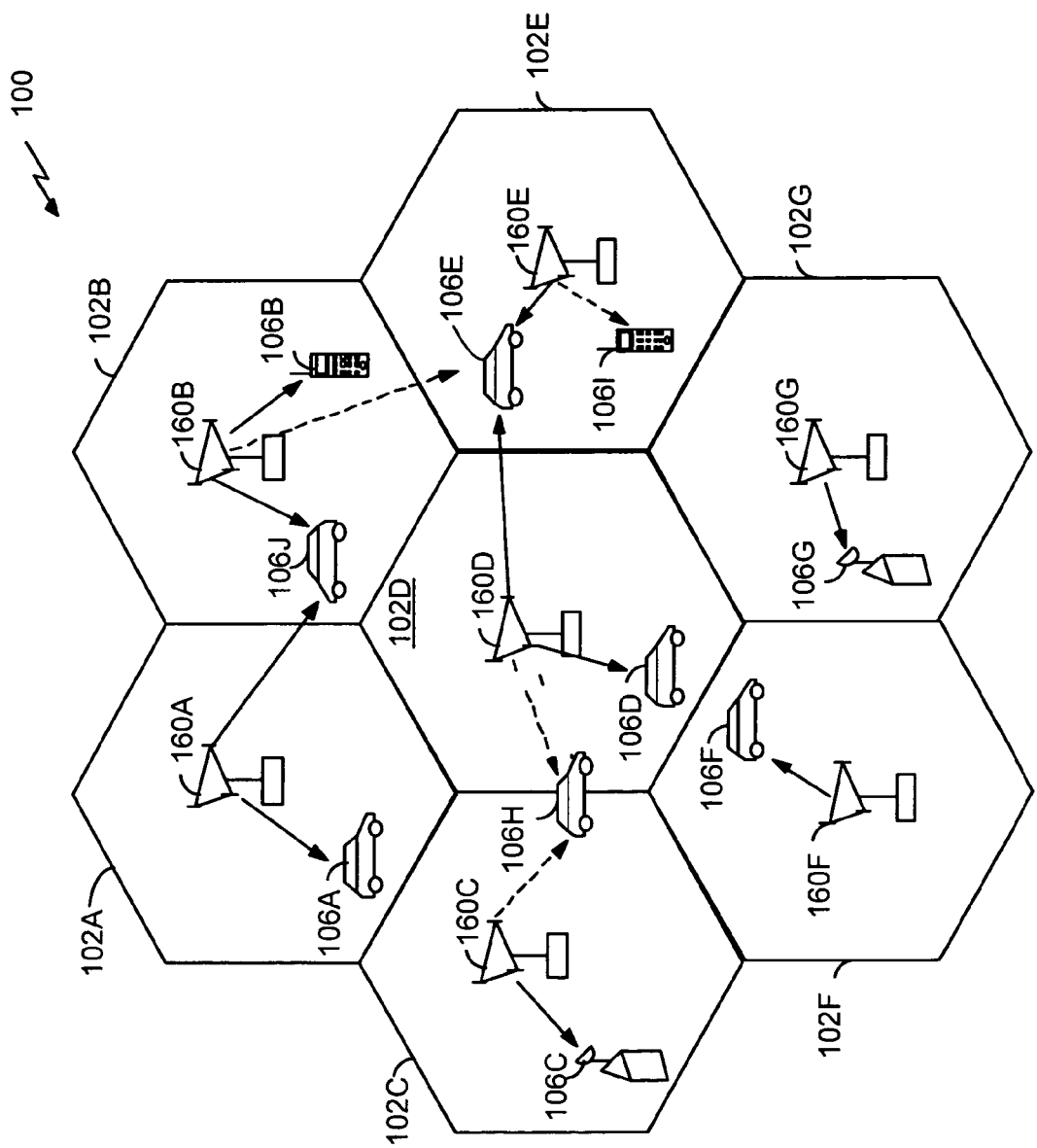
FIG. 1A is a diagram of a cellular communication system.
Figure 1B:
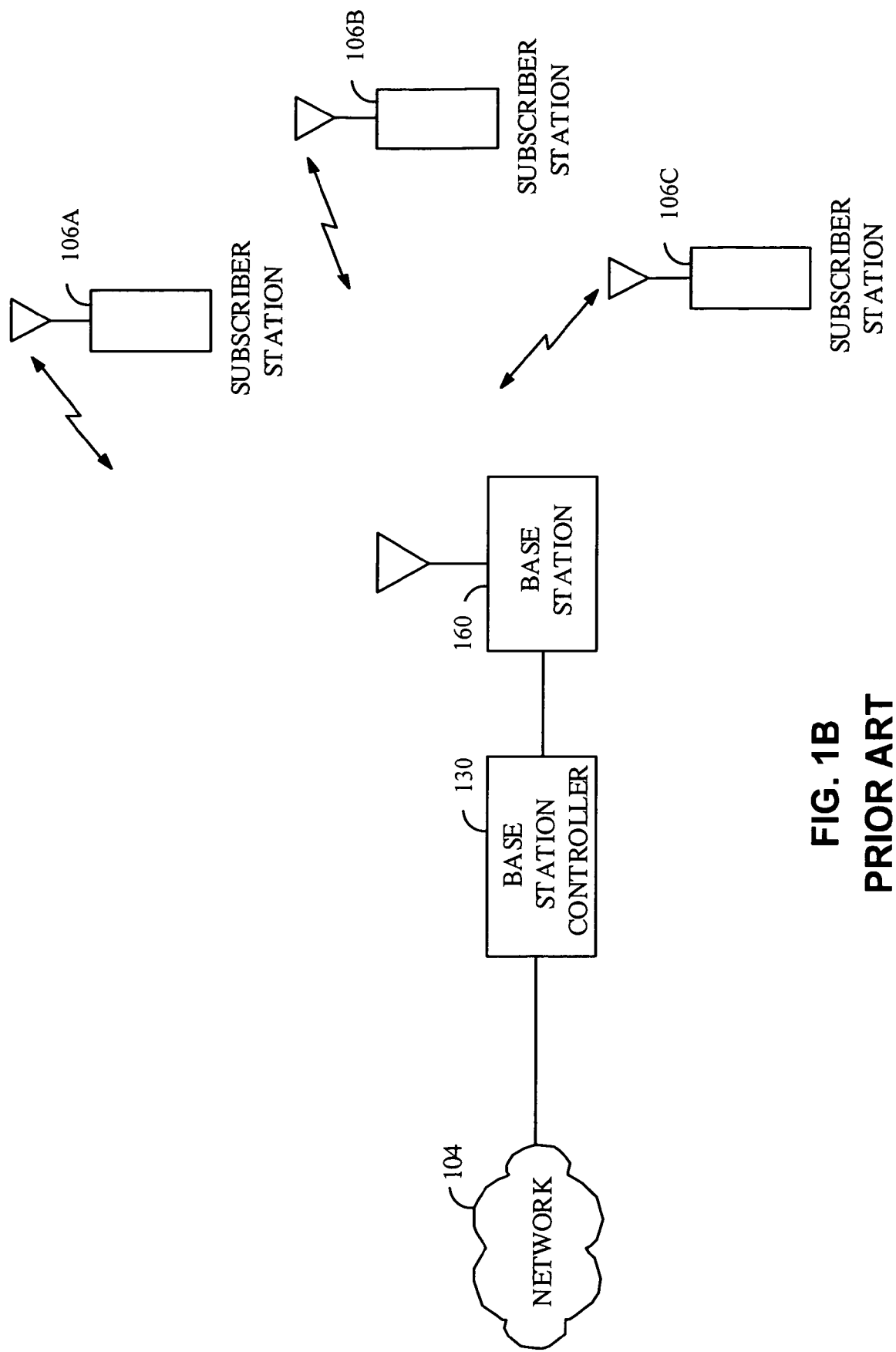
FIG. 1B is a simplified functional block diagram of an exemplary subscriber station adapted for operation in a CDMA communications system.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In an exemplary embodiment of a communications system, a power control system may be used to increase the number of users that may be supported by the system. For those users with multi-channel capability, gain computation techniques may be employed to balance the relative transmission power between the channels. The gain computations may be performed through a power estimation process which controls the transmission power for one or more channels. In the event that the total transmission power exceeds the power limitations of the user, a systematic back off procedure may be used to reduce the gain of one or more channels.

Various aspects of these gain computation techniques will be described in the context of a CDMA communications system, however, those skilled in the art will appreciate that the techniques for gain computation of multiple channels are likewise suitable for use in various other communications environments. Accordingly, any reference to a CDMA communications system is intended only to illustrate the inventive aspects of the present invention, with the understanding that such inventive aspects have a wide range of applications.

CDMA is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random noise (PN) code that modulates a carrier, and thereby, spreads the spectrum of the signal waveform. The transmitted signals are separated in the receiver by a correlator that uses a corresponding PN code to despread the desired signal's spectrum. The undesired signals, whose PN codes do not match, are not despread in bandwidth and contribute only to noise.

For data transmissions, the AN 120 receives a data request from the AT 106. The data request specifies the data rate at which the data is to be sent, the length of the data packet transmitted, and the sector from which the data is to be sent. The AT 106 determines the data rate based on the quality of the channel between the AN 120 and the AT 106. In one embodiment the quality of the channel is determined by the Carrier-to-Interference ratio, C/I. Alternate embodiments may use other metrics corresponding to the quality of the channel. The AT 106 provides requests for data transmissions by sending a data rate control message via a specific channel referred to as the DRC channel. The DRC message includes a data rate portion and a sector portion. The data rate portion indicates the requested data rate for the AN 120 to send the data, and the sector indicates the sector from which the AN 120 is to send the data. Both data-rate and sector information are typically required to process a data transmission. The data rate portion is referred to as a DRC value, and the sector portion is referred to as a DRC cover. The DRC value is a message sent to the AN 120 via the air interface. In one embodiment, each DRC value corresponds to a data rate in kbits/sec having an associated packet length according to a predetermined DRC value assignment. The assignment includes a DRC value specifying a null data rate. In practice, the null data rate indicates to the AN 120 that the AT 106 is not able to receive data. In one situation, for example, the quality of the channel is insufficient for the AT 106 to data accurately.

In operation, the AT 106 may continuously monitor the quality of the channel to calculate a data rate at which the AT 126 is able to receive a next data packet transmission. The AT 106 then generates a corresponding DRC value; the DRC value is transmitted to the AN 120 to request a data transmission. Note that typically data transmissions are partitioned into packets. The time required to transmit a packet of data is a function of the data rate applied.

This DRC signal also provides the information, which the channel scheduler 132 (see below) uses to determine the instantaneous rate for consuming information (or receiving transmitted data) for each of the remote stations 106 associated with each queue. According to an embodiment, a DRC signal transmitted from any remote station 106 indicates that the remote station 106 is capable of receiving data at any one of multiple effective data rates.

Figure 2:
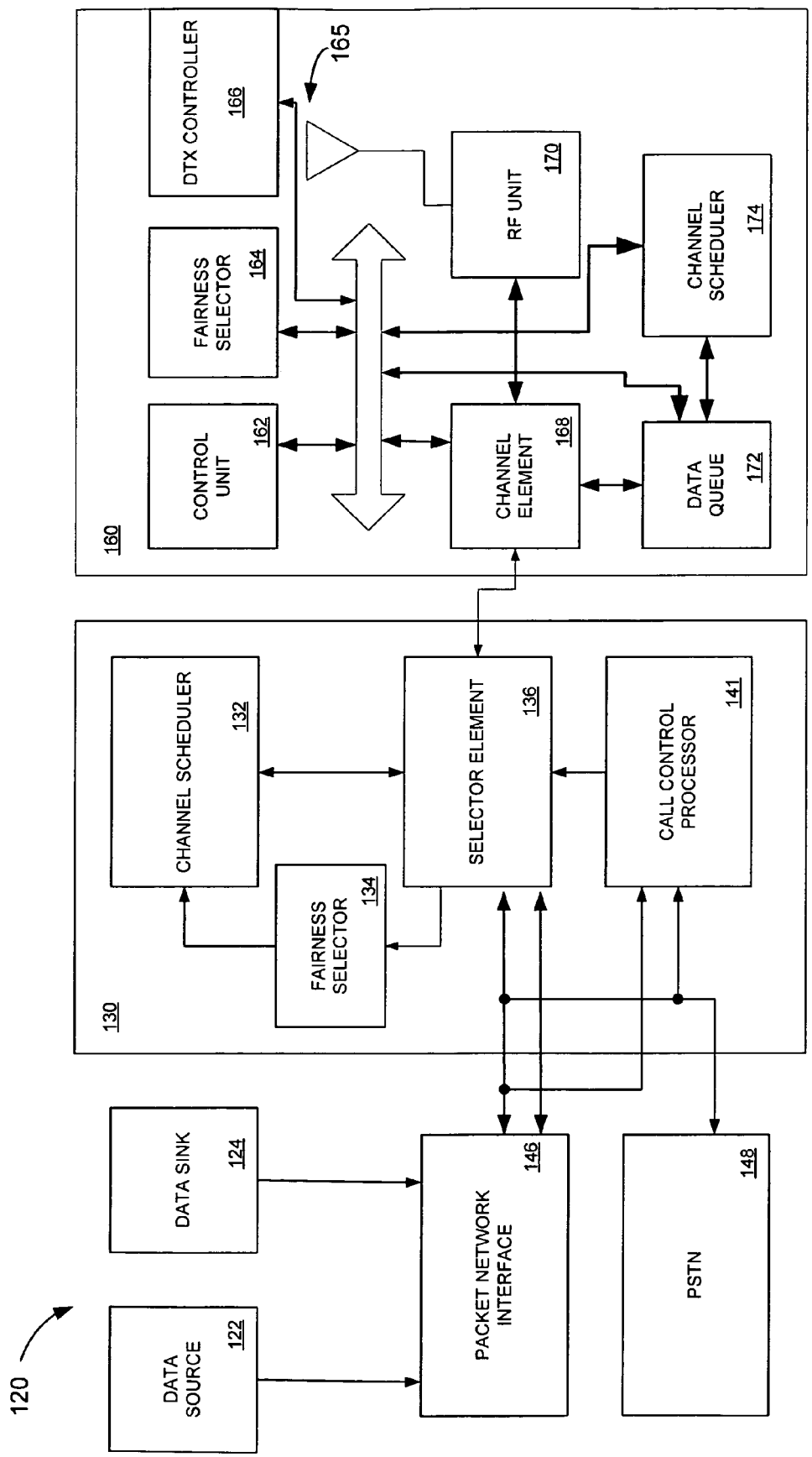
FIG. 2 is one example of a communication system supporting high data rate (HDR) transmissions and adapted for scheduling transmissions to multiple users.

One example of a communication system 100 supporting HDR transmissions and adapted for scheduling transmissions to multiple users is illustrated in FIG. 2. FIG. 2 is detailed hereinbelow, wherein specifically, a base station 160 and base station controller 130 interface with a packet network interface 146. Base station controller 130 includes a channel scheduler 132 for implementing a scheduling algorithm for transmissions in communication system 100. The channel scheduler 132 determines the length of a service interval during which data is to be transmitted to any particular remote station 106 based upon the remote station's 106 associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slot spread, i.e., 4 slots apart from each other. According to an embodiment, the instantaneous rate of receiving data $R_i$ determines the service interval length $L_i$ associated with a particular data queue.

In addition, the channel scheduler 132 selects the particular data queue 172 for transmission. The associated quantity of data to be transmitted is then retrieved from a data queue 172 and provided to the channel element 168 for transmission to the remote station 106 associated with the data queue 172. As discussed below, the channel scheduler 132 selects the queue 172 for providing the data, which is transmitted in a following service interval using information including the weight associated with each of the queues 172. The weight associated with the transmitted queue 172 is then updated.

Base station controller 130 interfaces with packet network interface 146, public switched telephone network (PSTN), 148, and all base stations 160 in the communication system 100 (only one base station 160 is shown in FIG. 2 for simplicity). Base station controller 130 coordinates the communication between remote stations 106 in the communication system 100 and other users connected to packet network interface 146 and PSTN 148. PSTN 148 interfaces with users through a standard telephone network (not shown in FIG. 2).

Base station controller 130 contains many selector elements 136, although only one is shown in FIG. 2 for simplicity. Each selector element 136 is assigned to control communication between one or more base stations 160 and one remote station 106 (not shown). If selector element 136 has not been assigned to a given remote station 106, call control processor 141 is informed of the need to page the remote station 106. Call control processor 141 then directs base station 160 to page the remote station 106.

Data source 122 contains a quantity of data, which is to be transmitted to a given remote station 106. Data source 122 provides the data to packet network interface 146. Packet network interface 146 receives the data and routes the data to the selector element 136. Selector element 136 then transmits the data to each base station 160 in communication with the target remote station 106. In the exemplary embodiment, each base station 160 maintains a data queue 172, which stores the data to be transmitted to the remote station 106.

The data is transmitted in data packets from data queue 172 to channel element 168. In the exemplary embodiment, on the forward link, a "data packet" refers to a quantity of data which is a maximum of 1024 bits and a quantity of data to be transmitted to a destination remote station 106 within a predetermined "time slot" (such as ≈1.667 msec). For each data packet, channel element 168 inserts the necessary control fields. In the exemplary embodiment, channel element 168 performs a cyclic redundancy check (CRC) encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna 165 to the forward link.

At the remote station 106, the forward link signal is received by an antenna and routed to a receiver 408. The receiver 408 filters, amplifies, quadrature demodulates, and quantizes the signal. The digitized signal is provided to a demodulator (DEMOD) 256 where it is despread with the short PNI and PNQ codes and decovered with the Walsh cover. The demodulated data is provided to a decoder 258 which performs the inverse of the signal processing functions done at base station 160, specifically the de-interleaving, decoding, and CRC check functions. The decoded data is provided to a data sink.

The hardware, as pointed out above, supports variable rate transmissions of data, messaging, voice, video, and other communications over the forward link. The rate of data transmitted from the data queue 172 varies to accommodate changes in signal strength and the noise environment at the remote station 106. Each of the remote stations 106 preferably transmits a DRC signal to an associated base station 160 at each time slot. The DRC signal provides information to the base station 160, which includes the identity of the remote station 106 and the rate at which the remote station 106 is to receive data from its associated data queue 172. Accordingly, circuitry at the remote station 106 measures the signal strength and estimates the noise environment at the remote station 106 to determine the rate information to be transmitted in the DRC signal.

The DRC signal transmitted by each remote station 106 travels through a reverse link channel and is received at base station 160 through a receive antenna 165 coupled to RF unit 170. In the exemplary embodiment, the DRC information is demodulated in channel element 168 and provided to a channel scheduler 174 located in the base station controller 130 or to a channel scheduler 132 located in the base station 160. In a first exemplary embodiment, the channel scheduler 174 is located in the base station 160. In an alternate embodiment, the channel scheduler 132 is located in the base station controller 130, and connects to all selector elements 136 within the base station controller 130.

In these HDR communications systems 100, the power of the pilot channel can also be balanced with the power of the DRC and ACK channels. This process involves spreading each of the DRC and ACK channels with a unique orthogonal code generated by using Walsh functions. A DRC gain can then be applied to the DRC channel to maintain an optimal DRC to pilot channel power ratio. Similarly, an ACK gain can also be applied to the ACK channel to maintain an optimal ACK to pilot channel power ratio.

Figure 3:
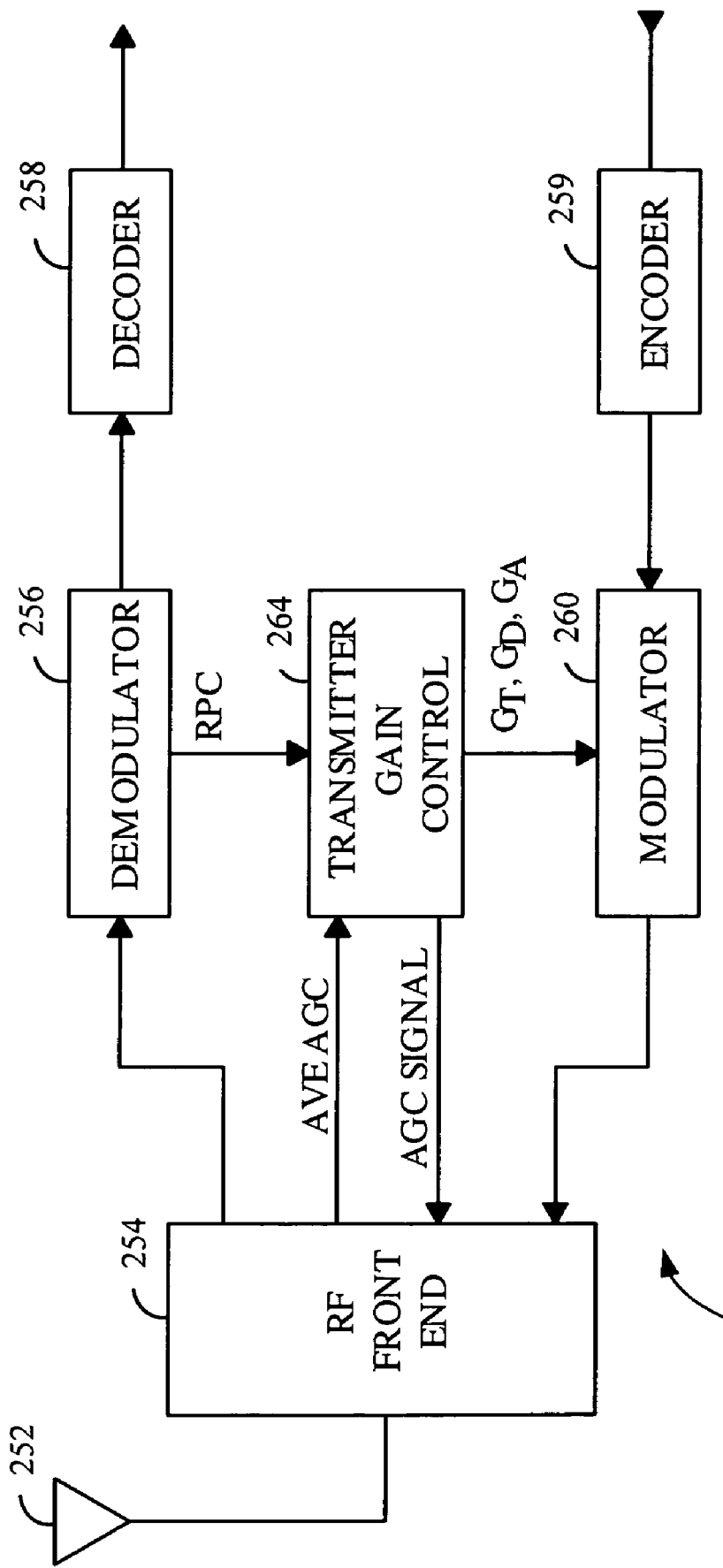
FIG. 3 is a functional block diagram of an exemplary subscriber station adapted for operation in a CDMA communication system.

A functional block diagram of an exemplary subscriber station 106 operating in a HDR communications system 100 is shown in FIG. 3. The exemplary subscriber station 106 includes a receiver and a transmitter both coupled to an antenna 252. The receiver includes an RF front end 254, a demodulator 256 and a decoder 258. The transmitter includes an encoder 259, a modulator 260, and shares the RF front end 254 with the receiver. The transmitter also includes a transmitter gain control 264 to control the reverse link transmission power in a manner to be discussed in greater detail later.

The RF front end 254 is coupled to the antenna 252. The receiver portion of the front end 254 downconverts, filters, amplifies and digitizes a signal received by the antenna 252. The receiver portion of the RF front end 254 also includes an AGC (not shown) to maximize the dynamic range of the digitized signal. The AGC can be utilized by the transmitter gain control 264 to compute the path loss between the base station 160 and the subscriber station 106 during the open loop power control estimation. The digitized signal from the receiver portion of the RF front end 254 can then be coupled to the demodulator 256 where it is quadrature demodulated with short PN codes, decovered by Walsh codes, and descrambled using a long PN code. The demodulated signal can then be provided to the decoder 258 for forward error corrections. The demodulator 256 can also be used to extract the RPC command from the reverse link transmission and provide it to the transmitter gain control 264 for closed loop power control computations.

The transmitter includes the encoder 259 which typically provides convolution coding and interleaving of the reverse link traffic channel. The encoded traffic channel is provided to the modulator 260 where it is spread with a Walsh cover and amplified by a traffic channel gain ($G_T$) computed by the transmitter gain control 264. The pilot channel, DRC channel, and ACK channel are also provided to the modulator 260 where they are each spread with a different Walsh cover and amplified by respective channel gains ($G_P$), ($G_D$), and ($G_A$) computed by the transmitter gain control 264. The channels are then combined, spread with a long PN code and quadrature modulated with short PN codes. The quadrature modulated signal is provided to the transmitter portion of the RF front end 254 where it is upconverted, filtered, and amplified for over the air forward link transmission through the antenna 252. The amplification of the quadrature modulated signal in the transmitter portion of the RF front end 254 is controlled by an AGC signal from the transmitter gain control 264.

Figure 4:
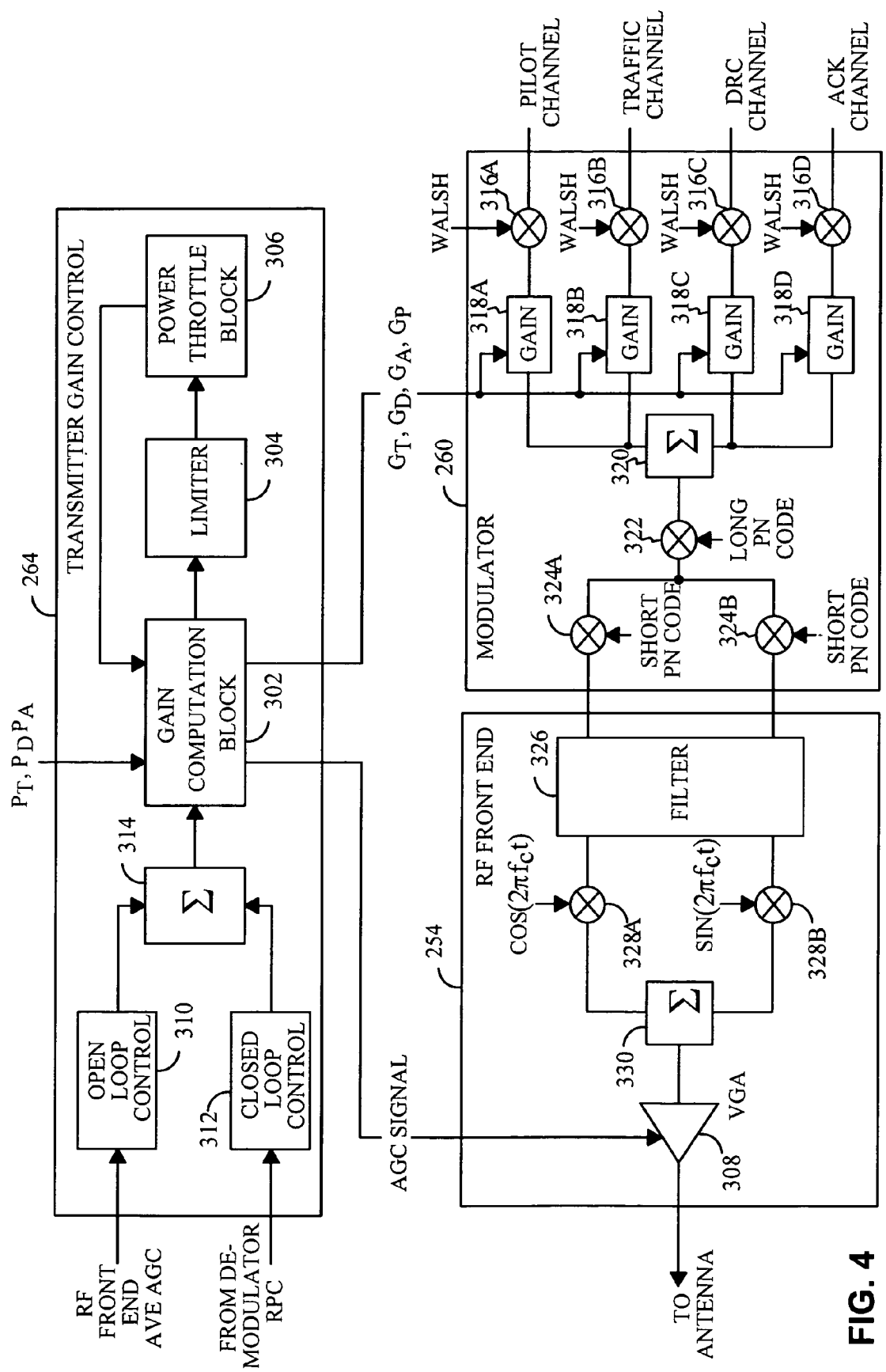
FIG. 4 is a functional block diagram of an exemplary transmitter gain control and transmitter from the subscriber station of FIG. 1B.

A functional block diagram of an exemplary transmitter gain control 264, modulator 260 and transmitter portion of the RF front end 254 is shown in FIG. 4. The transmitter gain control 264 includes a power and gain computation block 302 for computing the gains for the pilot, traffic, DRC, and ACK channels. The gain computations are based on predetermined power ratios for the traffic, DRC and ACK channels with respect to the pilot channel. A feedback loop can be used to reduce the channel gains under power limiting conditions by "throttling" or "backing off" the predetermined power ratios for the DRC and ACK channels. The feedback loop includes a limiter 304 and a power throttle block 306. The limiter 304 determines whether the total reverse link transmission power resulting from the predetermined power ratios exceeds the maximum power capability of the transmitter. The maximum power capability of the transmitter is limited by a variable gain amplifier (VGA) 308 and a power amplifier (not shown) in the RF front end 254. In the described exemplary embodiment, the power and gain computation block 302 also computes the total reverse link transmission power based on the predetermined power ratios and the estimated reverse link power for the pilot channel. If the resultant total reverse link transmission power exceeds the power capability of the transmitter, the power throttle block 306 is used to back off the power ratios for the DRC and ACK channels in a manner to be described in greater detail later.

The transmitter gain control 264 can be implemented with a variety of technologies including, by way of example, embedded communications software. The embedded communications software can be run on a programmable digital signal processor (DSP). Alternatively, the transmitter gain control 264 can be implemented with a general purpose processor running a software program, an application specific integrated circuit (ASIC), a field programmable gate array (FPGA) or other programmable logic device, discrete gate or transistor logic, discrete hardware components, or any combination thereof.

In the described exemplary embodiment, the power ratios for the traffic, DRC and ACK channels with respect to the pilot channel can be used to compute the channel gains. Accordingly, computational complexity can be reduced if the appropriate power ratios are first determined using the feedback loop before the gain computations are made. As explained above, the feedback loop is used to "throttle" or "back off" the predetermined power ratios of the DRC and ACK channels with respect to the pilot channel if the total reverse link transmission power exceeds the maximum power capability of the transmitter. The total reverse link transmission power can be computed by solving the following equation:

$$\text{Total Power} = \text{Pilot Channel Power} + 10 \log_{10}(1 + P_T + \beta_D \cdot P_D + \beta_A \cdot P_A) \quad (1)$$

where:
$P_T$ is the traffic to pilot channel power ratio;
$P_D$ is the DRC to pilot channel power ratio;
$\beta_D$ is a value used to back off the DRC power ratio;
$P_A$ is the ACK to pilot channel power ratio; and
$\beta_A$ is a value used to back off the ACK power ratio.

The "Pilot Channel Power" is estimated by two power control loops. An open control loop 310 generates an estimate of the required transmission power on the pilot channel based on the average value of the AGC from the receiver. The open loop estimate can then be computed by means well known in the art for nominal base station 160 loading and effective radiated power (EP). Information about variations from the nominal base station 160 loading and ERP can be communicated from the base station 160 to the subscriber station 106 and used to adjust the open loop estimate by means well known in the art.

A closed control loop 312 can be used to increment or decrement the current closed loop estimate based on the RPC commands recovered from the demodulator 256.

The resultant closed loop estimate is summed with the open loop estimate by a summer 314. The sum of the open and closed loop estimates yields the total reverse link power for the pilot channel. This sum is provided to the power and gain computation block 302 where it is used as the "Pilot Channel Power" in equation (1).

The traffic to pilot channel power ratio $P_T$ can be computed in a variety of fashions. In at least one embodiment, the traffic to pilot channel power ratio can be predetermined for each data rate supported by the reverse link transmission either by empirical analysis, simulation, experimentation, or any other means to achieve a desired quality of service. By way of example, in at least one simulation it has been shown that for a 9.6 k data rate, the traffic to pilot channel ratio may be between −2.25 db and 9 dB. If the data rate is increased to 38.4 k, the traffic to pilot channel power ratio should be between 3.75 dB and 15 dB. Those skilled in the art will readily be able to determine the appropriate traffic to pilot channel power ratio values for all data rates supported by their particular application. These predetermined power ratio values can be stored at the base station 160 and transmitted to each subscriber station 106 in its respective cell or sector over a forward link control channel. Alternatively, the predetermined power ratio values can be stored or computed at the subscriber station 106.

The DRC to pilot channel power ratio $P_D$ and the ACK to pilot channel ratio $P_A$ can also be computed in a variety of fashions. Similar to the traffic to pilot channel power ratio, the DRC and ACK power ratios can be predetermined either by empirical analysis, simulation, experimentation, or any other means to achieve a desired quality of service. In at least one embodiment of the exemplary HDR communications system, the DRC to pilot channel power ratio can take on values between −9 dB and 6 dB in 1 dB increments and the ACK to pilot channel power ratio can take on values between −3 dB and 6 dB also in 1 dB increments. These predetermined power ratio values can be stored at the base station 160 and transmitted to each subscriber station 106 in its respective cell or sector over the control channel. Alternatively, the predetermined power ratio values can be stored or computed at the subscriber station 106.

To compute the total reverse link transmission power from equation (1), the channel power ratio values can be converted into the linear domain as follows:

$$P_T = 10^{(\text{Traffic Power Ratio Value}/10)} \quad (2)$$

$$P_D = 10^{(\text{DRC Power Ratio Value}/10)} \quad (3)$$

$$P_A = 10^{(\text{ACK Power Ratio Value}/10)} \quad (4)$$

The power throttle block 306 is used to reduce the power ratios for the DRC and ACK channels under power limiting conditions. The power throttle block 306 can accomplish this by generating values $\beta_D$ and $\beta_A$ and feeding them back to the power and gain computation block 302 for scaling the DRC and ACK power ratios, respectively. The DRC and ACK values can be expressed in the linear domain respectively as:

$$\beta_D = 10^{(-DRCbackoff/10)} \quad (5)$$

$$\beta_A = 10^{(-ACKbackoff/10)} \quad (6)$$

From the above equations, one skilled in the art will readily appreciate that a 1 dB reduction in the DRC to pilot channel power ratio can be achieved by setting "DRCbackoff" in equation (5) to 1. A 2 dB reduction in the ACK to pilot channel power ratio can be achieved by setting "ACKbackoff" in equation (6) to 2. Thus, any incremental reduction scheme can be implemented depending on the particular design parameters and the specific communications application.

In the described exemplary embodiment, the "Total Power" in equation (1) is initially computed by the power and gain computation block 302 with the values $\beta_D$ and $\beta_A$ set to 1 so that the power ratios for each channel are set to their predetermined optimal or desired values. The computed "Total Power" is provided to the limiter 304.

The limiter 304 compares the computed "Total Power" to the maximum power capability of the transmitter. If the computed "Total Power" exceeds the power limitations of the transmitter, then the reverse link data rate can be lowered to reduce the total reverse link transmission power. In response to the reduced data rate, the power and gain computation block 302 selects a new predetermined traffic to pilot channel power ratio corresponding to the reduced data rate. The "Total Power" can then be recomputed by the power and gain computation block 302 and provided to the limiter 304 for comparison with the maximum power capability of the transmitter. This procedure continues until the computed "Total Power" comes within the power capability of the transmitter or the reverse link data rate is reduced to the lowest data rate supported by the communications system 120.

In the event that the "Total Power" computed by the power and gain computation block 302 exceeds the maximum power capability of the transmitter at the lowest data rate supported by the communications system, the limiter 304 can be used to ratchet the closed control loop 312 such that RPC up commands are ignored. This can be achieved by holding the current closed loop estimate constant in response to an RPC up command and reducing the current closed loop estimate in response to an RPC down command. In some embodiments, ratcheting can be supported at both ends of the transmitter power level such that RPC down commands are ignored if the reverse link transmission power is below a minimum operating threshold.

The limiter 304 also enables the power throttle block 306 to implement a "back off" algorithm to adjust the values $\beta_D$ and $\beta_A$ to systematically reduce the power ratios for one or both of the DRC and ACK channels until the "Total Power" computed by the power and gain computation block is within the maximum power capability of the transmitter. The manner in which the values $\beta_D$ and $\beta_A$ are reduced and the resultant incremental reduction in the power ratios of the channels may vary depending on the system application and the overall design constraints.

Figure 5:
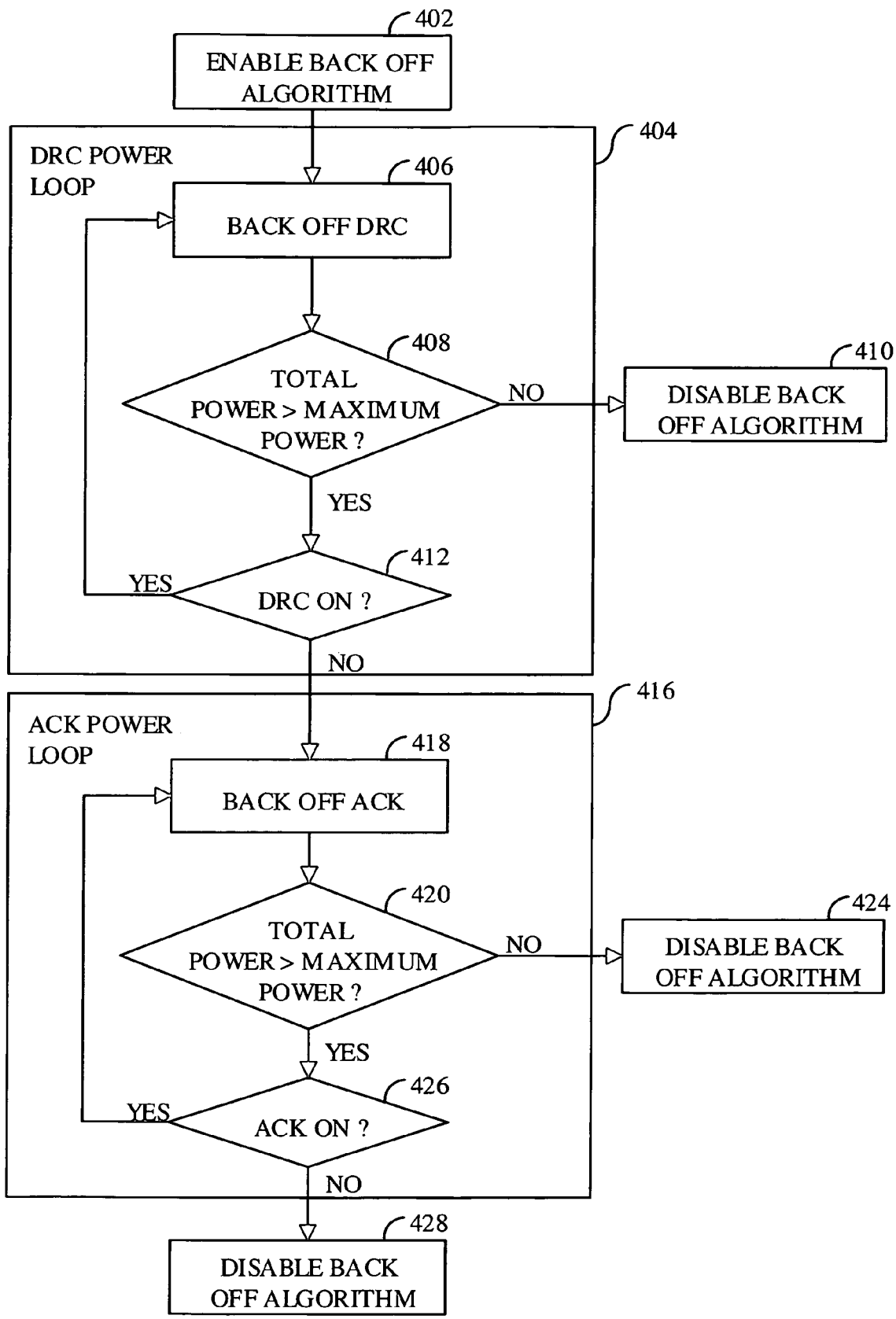
FIG. 5 is a flow chart illustrating a back off method implemented by the transmitter gain control of FIG. 4.

A flow chart illustrating an exemplary back off method is shown in FIG. 5. Initially, the limiter is used to enable the back off algorithm in step 402. Once the back off method is enabled, a DRC power loop 404 is entered into. In the DRC power loop 404, the DRC to pilot channel power ratio can backed off by 1 dB in step 406. This can be achieved by recomputing the DRC value $\beta_D$ with the "DRCbackoff" in equation (5) at 1. Alternatively, the "DRCbackoff" in equation (5) can be set to any value to achieve a desired reduction in the DRC to pilot channel power ratio. In any event, the recomputed DRC value $\beta_D$ can be fed back to the to the power and gain computation block 302. The "Total Power" can then be recomputed and provided to the limiter 304 to determine whether the total reverse link transmission power is within the maximum power capability of the transmitter.

In step 408, the results from the limiter 304 are provided to the gain throttle block. If the recomputed "Total Power" is within the maximum power capability of the transmitter, the power throttle block 306 is disabled in step 410. Conversely, if the recomputed "Total Power" still exceeds the maximum power capability of the transmitter, then the power throttle block 306 determines whether the DRC channel remains in the "on" state in step 412. The DRC channel is determined to be in the "on" state it the DRC $\beta_D$ is greater than 0, or some other minimum threshold value. If the DRC channel remains in the "on" state, then the method loops back to step 406 and reduces the DRC to pilot channel power ratio another dB by setting the "DRCbackoff" in equation (5) to 2 which will result in a 2 dB reduction in the DRC to pilot channel ratio. The back off method remains in the DRC power loop 404 until either the power throttle block 306 is disabled in step 410 or the DRC value $\beta_D$ is reduced below the minimum threshold. Should the DRC value $\beta_D$ be reduced below the minimum threshold, then the back off algorithm exits the DRC power gain loop 404 and enters an ACK power loop 416.

In the ACK power loop 416, the ACK to pilot channel power ratio can backed off by 1 dB in step 418. This can be achieved by recomputing the ACK value $\beta_A$ with the "ACKbackoff" in equation (6) at 1. Alternatively, the "ACKbackoff" in equation (6) can be set to any value to achieve a desired reduction in the ACK to pilot channel power ratio. In any event, the recomputed ACK value $\beta_A$ can be fed back to the to the power and gain computation block. The "Total Power" can then be recomputed and provided to the limiter 304 to determine whether the total reverse link transmission power is within the maximum power capability of the transmitter.

In step 420, the results from the limiter 304 are provided to the gain throttle block. If the recomputed "Total Power" is within the maximum power capability of the transmitter, the power throttle block 306 is disabled in step 424. Conversely, if the recomputed "Total Power" still exceeds the maximum power capability of the transmitter, then the power throttle block 306 determines whether the ACK channel remains in the "on" state. The ACK channel is determined to be in the "on" state if the ACK value $\beta_A$ is greater than 0, or some other minimum threshold value. If the ACK channel remains in the "on" state, then the method loops back to step 418 and reduces the ACK to pilot channel power ratio another dB by setting the "ACKbackoff" in equation (6) to 2 which will result in a 2 dB reduction in the ACK to pilot channel ratio. The back off method remains in the ACK power loop 416 until either the power throttle block 306 is disabled by the limiter 304 in step 424 or the ACK value $\beta_A$ is reduced below the minimum threshold. Should the ACK value $\beta_A$ be reduced below the minimum threshold, then the back off algorithm is disabled by exiting the ACK power loop in step 424. In that event, other power reduction techniques can be employed to bring the total reverse link transmission power within the maximum power capability of the transmitter.

The exemplary embodiment of the back off method described in connection with FIG. 5 may be computationally intensive depending on the predetermined power ratios for the DRC and ACK channels. By way of example, if the predetermined power ratios for the DRC and ACK channels are each set to the 6 dB maximum, there is a possibility that 16 passes through the DRC power loop 404 and 10 passes through the ACK power loop 416 might be required to back off the DRC and ACK power ratios. To reduce the potential computational complexity, an alternative back off method may be implemented that computes the DRC value $\beta_D$ in a single step, and if necessary, computes the ACK value $\beta_A$ in a single step. This can be achieved in a variety of ways. By way of example, equation (1) can be manipulated to solve for the value of interest by defining a total power to pilot channel power ratio and setting it to a value relating to the maximum power capability of the transmitter. This can be achieved by rewriting equation (1) in the linear domain as:

$$R = 1 + P_T + P_D + P_A \quad (7)$$

$$R_M \geq 1 + P_T + \beta_D \cdot P_D + \beta_A \cdot P_A \quad (8)$$

where R represents the total power to pilot channel power ratio before enabling the back off method, and $R_M$ is the maximum allowed value of R after computing the values $\beta_D$ and $\beta_A$.

Figure 6:
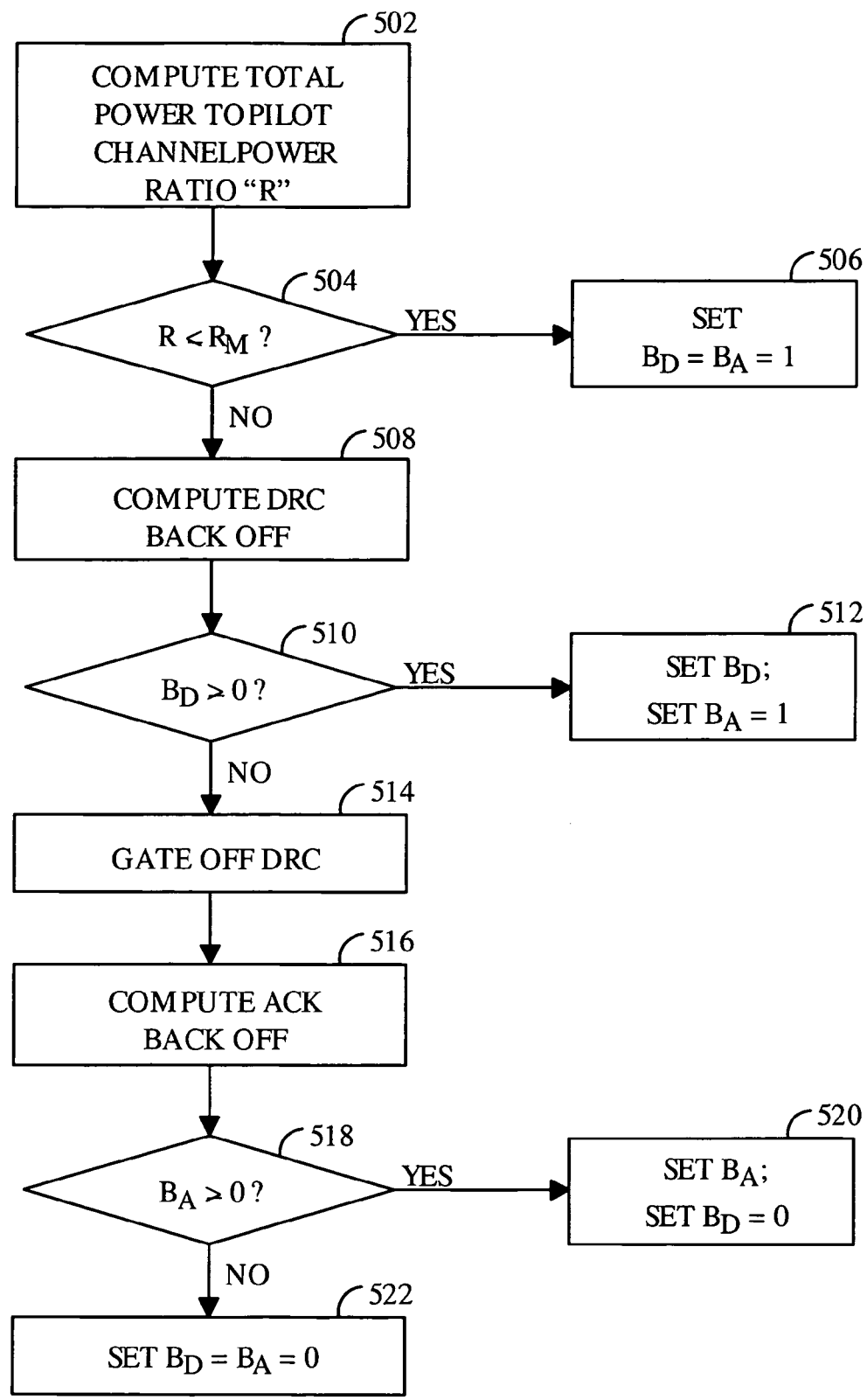
FIG. 6 is a flow chart illustrating an alternative back off method implemented by the transmitter gain control of FIG. 4.

A flow chart illustrating an exemplary method utilizing equations (7) and (8) is shown in FIG. 6. In step 502, the total power to pilot channel power ratio R is computed. The computed power ratio is then compared to the maximum allowable total power to pilot channel power ratio $R_M$ in step 504. If $R \leq R_M$, then the DRC and ACK power ratios do not require back off. In that event, the values $\beta_D$ and $\beta_A$ are set to 1 by the power throttle block 306 and fed back to the power and gain computation block 302 in step 506. Conversely, if R is greater than $R_M$, the DRC value $\beta_D$ can then be computed in step 508.

The DRC value $\beta_D$ can be computed by setting the ACK value $\beta_A$ to 1 and solving for the DRC value $\beta_D$ in equation (8). With the ACK value $\beta_A$ set to 1, equation (8) can be rewritten as:

$$\beta_D = (R_M - 1 - P_T - P_A)/P_D \quad (9)$$

In step 510, the resultant DRC value computation is examined to determine whether it is positive. If $\beta_D \geq 0$, then the computed DRC value $\beta_D$ will reduce the DRC to pilot channel power ratio to a level that will result in a "Total Power" computation within the maximum power capability of the transmitter. In that event, the ACK value $\beta_A$ is set to 1 and fed back along with the computed DRC value $\beta_D$ to the power and gain computation block 302 in step 512. Conversely, if the DRC value $\beta_D$ is negative, then the DRC channel is gated off by setting the DRC value $\beta_D$ to 0 in step 514.

Once the DRC channel is gated off, the ACK valve $\beta_A$ value can be computed in step 516. The ACK value $\beta_A$ can be computed by setting the DRC value $\beta_D$ to 0 and solving for the ACK value $\beta_A$ in equation (8). With the DRC value $\beta_D$ set to 0, equation (8) can be rewritten as:

$$\beta_A = (R_M - 1 - P_T)/P_A \quad (10)$$

In step 518, the resultant ACK value computation is examined to determine whether it is positive. If $\beta_A \geq 0$, then the computed ACK value $\beta_A$ will reduce the ACK to pilot channel power ratio to a level that will result in a "Total Power" computation by the power and gain computation block 302 within the maximum power capability of the transmitter. In that event, the DRC value $\beta_D$ is set to 0 and fed back along with the computed ACK value $\beta_A$ to the power and gain computation block 302 in step 520. Conversely, if the ACK value $\beta_A$ is negative, then the ACK channel is gated off by setting the ACK value $\beta_A$ to 0 in step 522.

Regardless of the back off method implemented by the power throttle block 306, the power and gain computation block 302 will compute the gains for the traffic, DRC, ACK and pilot channels once the limiter 304 determines that the total reverse link transmission power is within the maximum power capability of the transmitter. Since the gains will be applied to their respective channels in the digital domain, it is advantageous to scale the gains to prevent an increase in the number of bits as the gain adjusted channels are added together in the modulator 260. This can be accomplished by setting the gains such that the sum of their squares equals 1 as follows:

$$G_P^2 + G_T^2 + G_D^2 + G_A^2 = 1 \quad (11)$$

Equation (11) can be resolved as follows for each channel gain:

$$G_P = 1/\sqrt{1+P_T+\beta_D \cdot P_D + \beta_A \cdot P_A} \quad (12)$$

$$G_T = \sqrt{P_T}/\sqrt{1+P_T+\beta_D \cdot P_D + \beta_A \cdot P_A} \quad (13)$$

$$G_D = \sqrt{\beta_D \cdot P_D}/\sqrt{1+P_T+\beta_D \cdot P_D + \beta_A \cdot P_A} \quad (14)$$

$$G_A = \sqrt{\beta_A \cdot P_A}/\sqrt{1+P_T+\beta_D \cdot P_D + \beta_A \cdot P_A} \quad (15).$$

Referring back to FIG. 4, the channel gains computed by the power and gain computation block 302 can be coupled to the modulator 260. The modulator 260 includes a mixer 316B which is used to spread the encoded traffic channel from the encoder 259 with a Walsh function. The pilot, DRC and ACK channels are also provided to mixers 316A, 316C, and 316D, respectively, where they are each spread with a different Walsh cover. The Walsh covered traffic, pilot, DRC and ACK channels are provided to gain elements 318A-D, respectively, where their respective gains computed by the power and gain computation block 302 are applied. The outputs of the gain elements 318A-D are provided to a summer 320 where they are combined with the pilot channel. The combined channels are then coupled to a mixer 322 where they are spread using the long PN code. The spread channels are then split into a complex signal having an in-phase (I) component and a quadrature phase (Q) component. The complex signal is quadrature modulated with the short PN codes by mixers 324A and 324B before being output to the transmitter portion of the RF front end 254.

A complex baseband filter 326 is positioned at the input to the RF front end 254 to reject out of band components of the quadrature modulated signal. The filtered complex signal is provided to quadrature mixers 328A and 328B where it is modulated onto a carrier waveform before being combined by a summer 330. The combined signal is then provided to the VGA 308 to control the power of the reverse link transmission through the antenna. An AGC signal from the power and gain computation block 302 is used to set the gain of the of the VGA 308. The AGC signal is based on the "Total Power" computed by the power and gain computation block 302 from equation (1).

Transmission scheduling in a circuit-switched system may involve a proportional fair algorithm, wherein a priority function is defined for each user. An example of a proportional fair algorithm is presented hereinbelow. The priority function may take into consideration the requested data rate for a given user, typically a function of forward link channel quality to the user, and the throughput for the user. Capacity is thus balanced by first serving those users having high requested data rates compared to throughput.

Transmission scheduling in a packet-switched system, according to one embodiment, balances capacity with user delay. Application flows are transmitted as datagrams, which are independent, self-contained messages sent over a network. The datagram arrival, arrival time, and content are not generally guaranteed. Datagrams associated with a same application flow may be transmitted by different routes to a same user. The datagrams are reassembled at the receiver.

The cases presented in the present discussion include: i) multi-carrier reverse link; and ii) multi-carrier forward link and single carrier reverse link, referred to as asymmetric mode. This patent application presents RL power throttling rules for the following embodiments: i) single carrier RL; and ii) multi-carrier RL embodiments.

There is a need to throttle power on the reverse link so as to conserve resources and reduce interference with other communications, such as from other remote stations 106 to the base station 160, etc. In one embodiment, throttling is used to indicate decreasing power to meet power amplifier (PA) 308 constraints. In a multi-carrier system, the AN 120 sends a Traffic Channel Assignment message to the AT 106 indicating which is the primary carrier and which are the secondary carriers.

Figure 7:
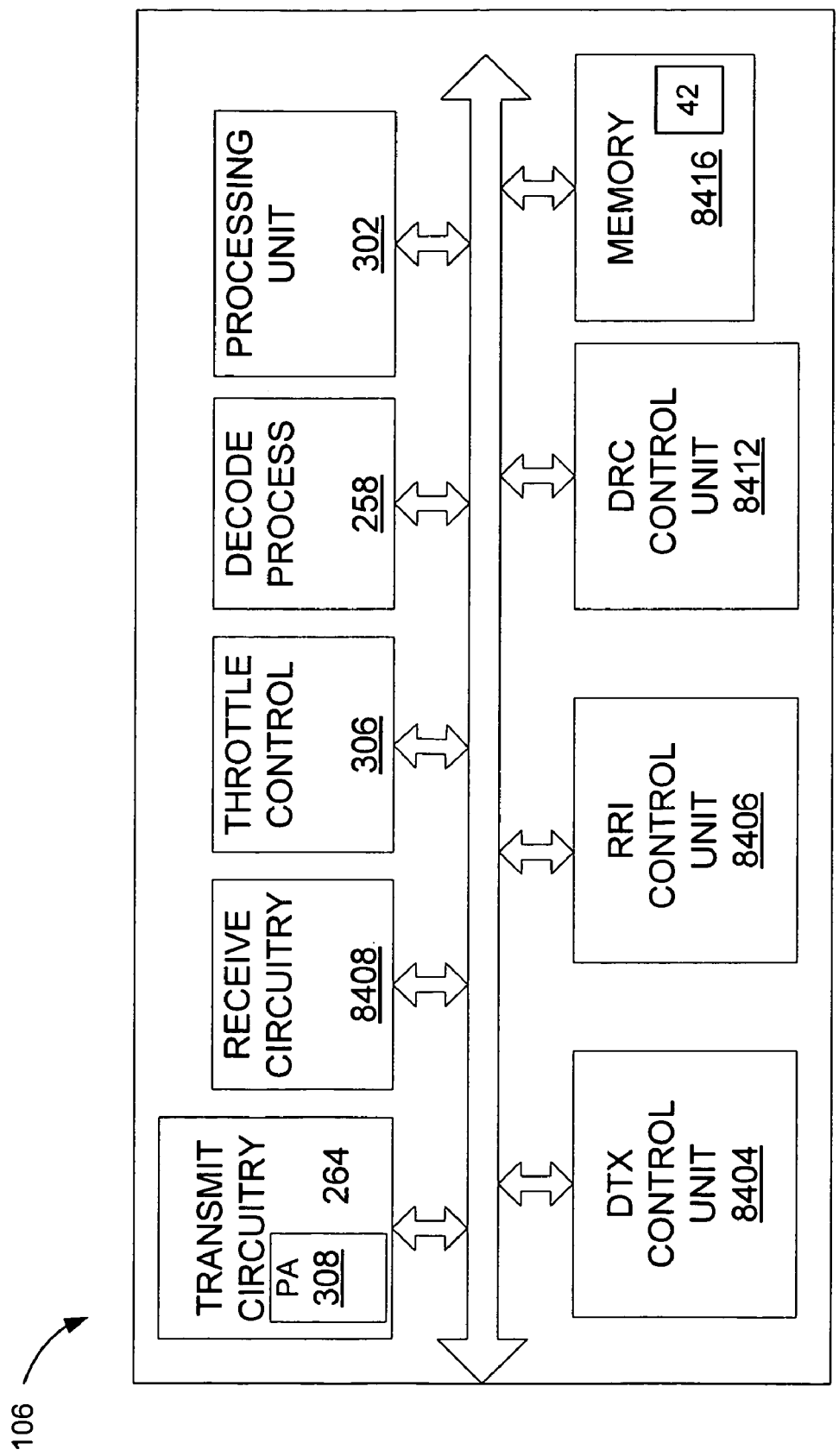
FIG. 7 illustrates an access terminal (AT) according to the present patent application.

In one embodiment, shown in FIG. 7, a handset is the AT 106. A power amp (PA) 308 located in the transmit circuitry 264 of AT 106 can become saturated if too much RF power is input. The input RF power to the PA 308 may be reduced to allow enough headroom to prevent the PA 308 from saturating during operation.

In one embodiment, the secondary carrier powers are throttled (e.g., RF transmit power is reduced) to allow headroom for the primary carrier. In this case, the pilot, overhead and traffic channel RF power levels are summed over all assigned reverse link carriers for that AT 106. The sum is kept less than or equal to the maximum allowed transmit power for the PA 308. If the sum total of the transmit powers input to the PA 308 exceeds the maximum rated power of the PA 308 residing in the AT 106, the method of reducing power disclosed in FIGS. 8-17 may be implemented across the various channels in each assigned carrier. If there is still not enough headroom, the primary carrier power is also throttled.

The different embodiments include i) multi-carrier FL link with a multi-carrier RL, and ii) multi-carrier FL with a single carrier RL (asymmetric mode). The RL power throttling rules include single carrier and multi-carrier rules. As will be shown below, the different carriers, secondary and then primary, and the different channels on each carrier may be throttled in the order or sequence disclosed in the following paragraphs. The reason for following the sequences listed below when throttling power is that some carriers or channels may be considered of a lower value and may be throttled before another carrier or channel. For example, an acknowledge (ACK) may be considered of a high value because it is transmitted in one-half slot. On the other hand, data rate control (DRC) is transmitted for several slots so it may be less valuable. Thus, DRC may be throttled before ACK. However, since DRC may determine serving sector and rate, performance above a threshold may be useful. Data source control (DSC) determines the serving cell so performance above a threshold is also useful.

Single Carrier RL Throttle Rules

Figure 8:
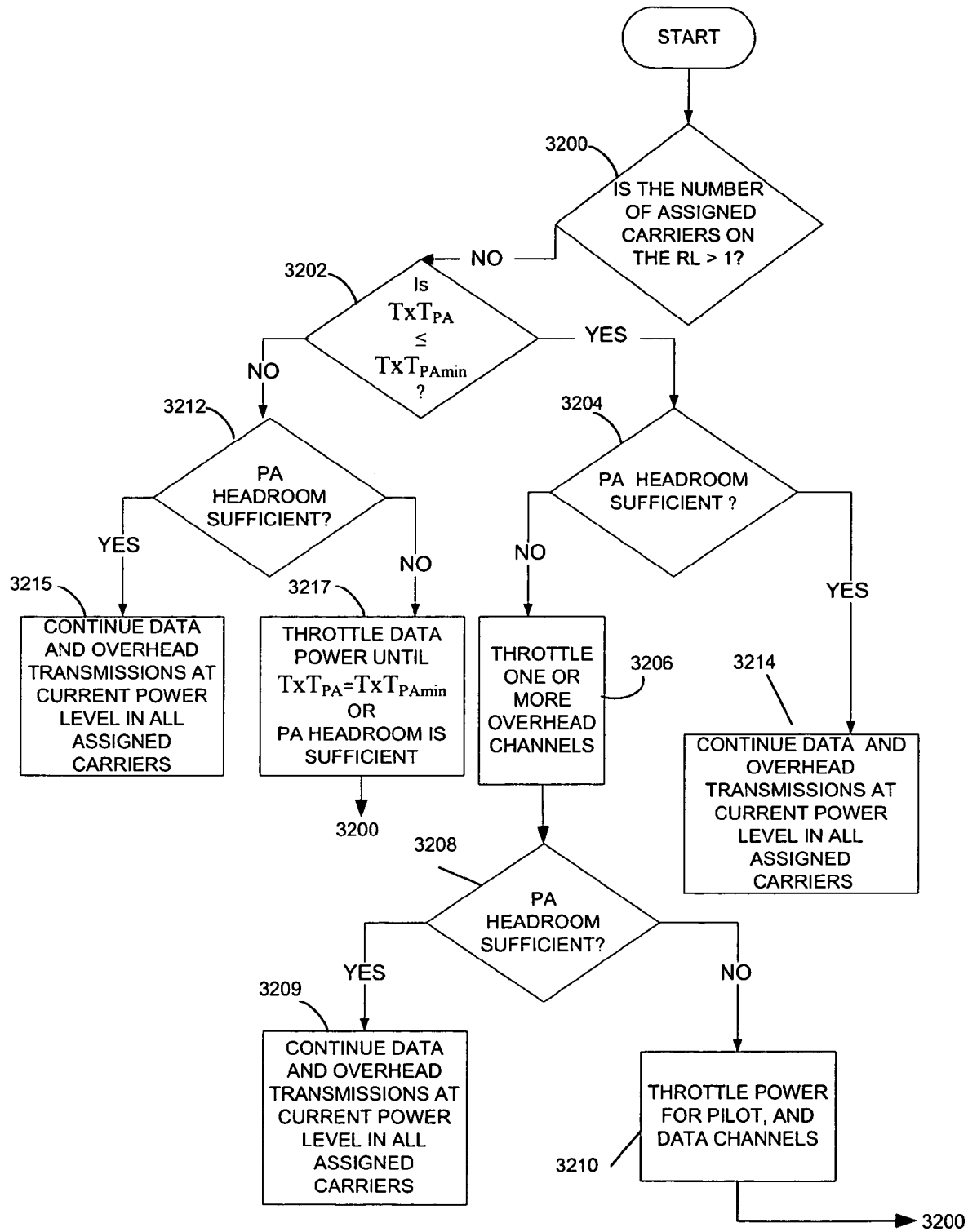
FIG. 8 is a flowchart disclosing steps and FIG. 19 is a similar diagram disclosing certain means that may be executed to reduce the transmit powers input to a power amplifier where the number of assigned reverse link (RL) equals 1.

For the single carrier RL power throttle rules (step 3200), if i) the transmit power level of the AT (T×T$_{AT}$) is less than or equal to the minimum transmit power level for that AT (T×T$_{minAT}$), i.e., T×T$_{AT}$≦T×T$_{minAT}$ (step 3202) and ii) the AT 106 is PA headroom limited (step 3204), the power is throttled in the following order: i) one or more overhead channels (step 3206), ii) the Pilot and the Data channels (Step 3210). FIG. 8 illustrates the steps executed in this embodiment.

FIG. 8

Step 3200, is the number of assigned carriers on the RL>1? If the answer is no, then execute step 3202, is T×T$_{AT}$≦T×T$_{minAT}$? If the answer to step 3202 is yes, then execute step 3204, is the PA headroom sufficient? If the answer to step 3204 is yes, then execute step 3214, continue data and overhead transmissions at current power levels in all assigned carriers.

If the answer to step 3204 is no, then execute step 3206, throttle one or more overhead channels. Then execute step 3208, is PA headroom sufficient? If the answer to step 3208 is yes, then execute step 3209, continue data and overhead transmissions at current power levels for all channels on the RL carrier which correspond to all assigned carriers. If the answer to step 3208 is no, then execute step 3210, throttle the power for the pilot and data channels on the RL which carry information for all carriers on the FL. Return to step 3200.

If the answer to step 3202 is no, then execute step 3212, is the PA headroom sufficient? If the answer to step 3212 is yes, then execute step 3215, continue data and overhead transmissions at current power levels in all assigned carriers. If the answer to step 3212 is no, then execute step 3217, throttle data channel power on the RL until $T \times T_{AT} = T \times T_{minAT}$ or PA Headroom is sufficient. Return to Step 3200.

In one embodiment, for the single carrier RL power throttle rules, if i) the transmitted traffic channel to pilot channel transmit power ratio of the AT 106 (TxT2P) is less than or equal to the minimum transmitted traffic channel to pilot channel transmit power ratio for that AT 106 (TxT2Pmin), i.e., $T \times T2P \leq T \times T2Pmin$ and ii) the AT 106 is PA headroom limited, the power is throttled in the following order: i) DSC, ii) DRC, iii) ACK, iv) Pilot, Data and reverse rate indicator (RRI).

It is noted that the DRC, DSC, ACK, RRI, Pilot and Data (or Traffic) are channels transmitted on the reverse link. The DRC, DSC, ACK, RRI and Pilot are overhead channels. In one embodiment, there is only one DSC on the reverse link which provides information to a base station 160 for one forward link carrier. On the other hand, there may be a plurality of DRC and ACK channels which provide information to a base station 160 for a primary and secondary FL carriers. Also, there will be one RRI and one Pilot channel on a reverse link carrier which provide information to the AT 106. It is also noted that the FL carriers carry traffic (or data) channels and overhead channels such as the ACK channel, the reverse power channel (RPC) and the reverse activity bit (RAB) channel. These overhead channels provide information to the AT 106.

Thus, for N=1 (single carrier RL region of operation, where N represents the number of carriers on the reverse link), asymmetric mode (its asymmetric mode because its multicarrier FL and single carrier RL) where $T \times T2P \leq T \times T2Pmin$ on the reverse link carrier and the PA headroom is not sufficient, the RL power is throttled in the following order until sufficient PA 308 headroom is reached: step 1) Throttle the DSC power on the RL down to the default level. If there still is not sufficient PA headroom, then step 2) throttle the DRC power for the DRC's on the reverse link which carry information for all the primary and secondary carriers on the FL until one of two conditions occur: i) there is sufficient PA headroom or ii) the DRC power has been throttled down. If there still is not sufficient PA headroom, then step 3), throttle the ACK power for the ACK channels on the reverse link which carry information for all the primary and secondary carriers on the FL until one of two conditions occur: i) there is sufficient PA headroom or ii) the ACK power has been throttled down. If there still is not sufficient PA headroom, then step 4) throttle one or more of the Pilot, Data, RRI and DSC channels on the RL until there is sufficient headroom.

Figure 9:
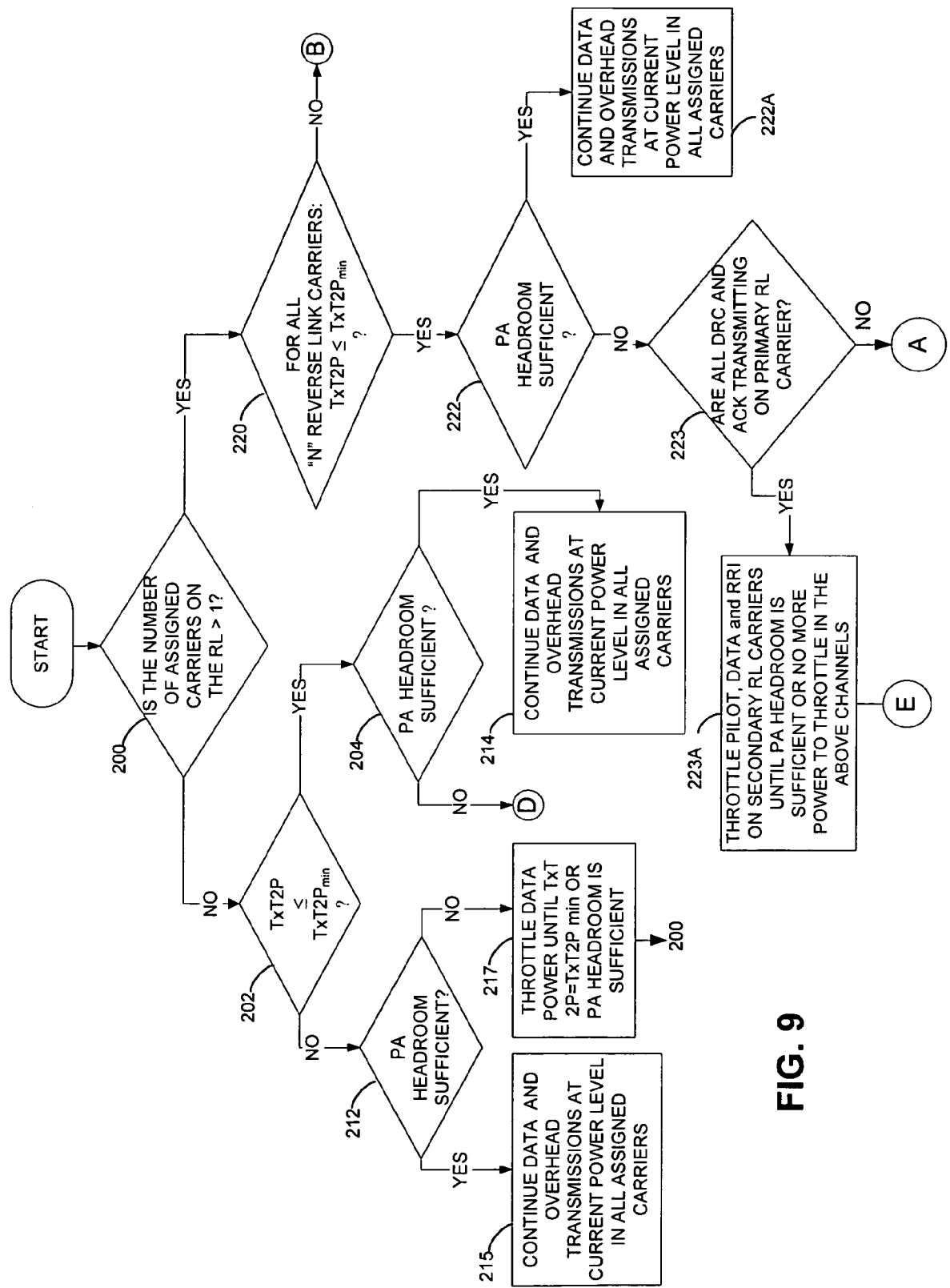
FIG. 9 is a flowchart disclosing steps and FIG. 20 is a similar diagram disclosing certain means that may be executed to reduce the transmit powers input to a power amplifier.
Figure 10:
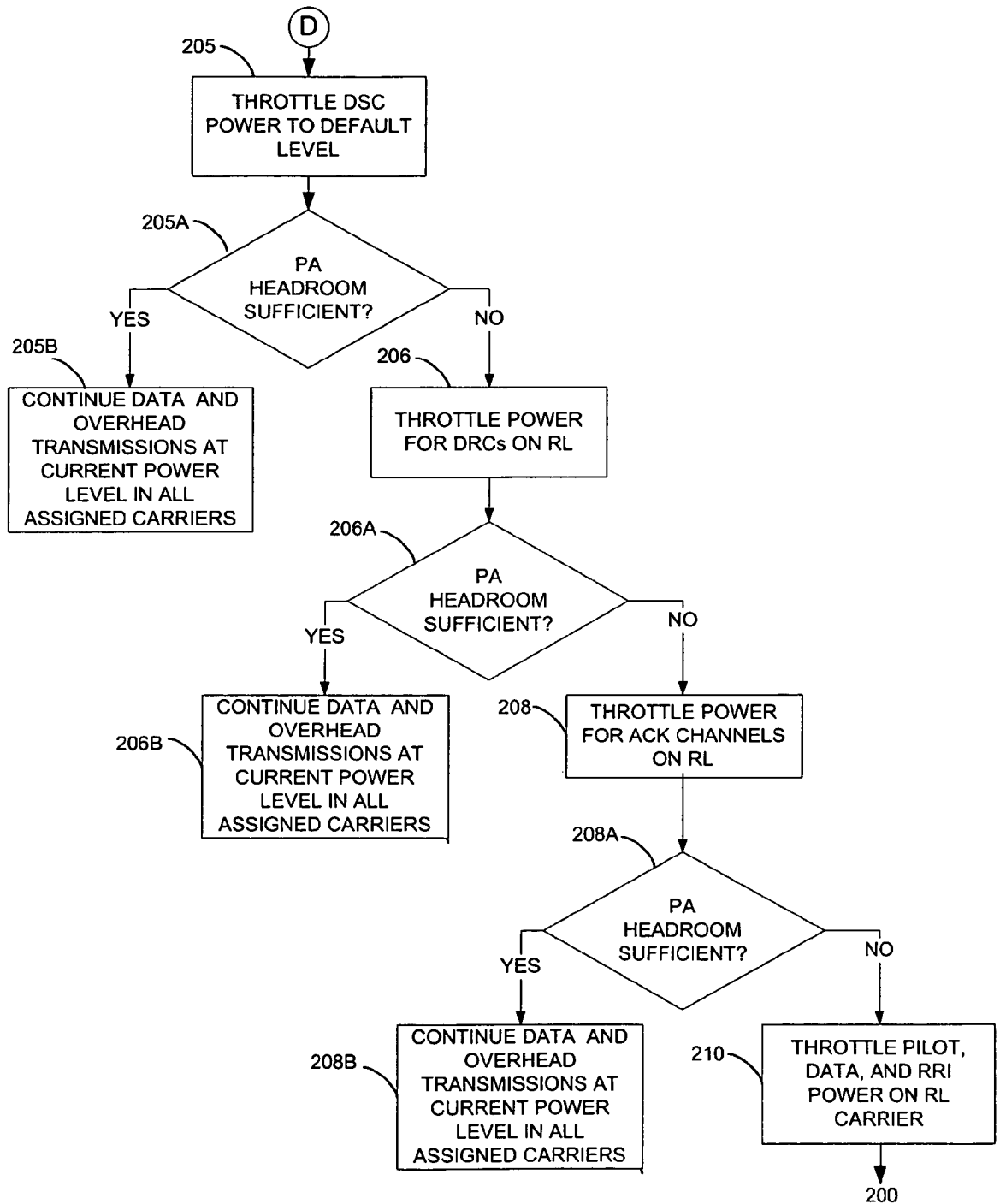
FIG. 10 is a flowchart disclosing steps and FIG. 21 is a similar diagram disclosing certain means that may be executed to reduce the transmit powers input to a power amplifier if in asymmetric mode, the reverse link has a single carrier and the forward link has multi-carriers and the PA headroom is not sufficient.

In FIGS. 9 and 10, this method of throttling power corresponds to the following steps:

FIG. 9

In step 200, is the number of assigned carriers on the RL>1? If the answer is no, then execute step 202, is $T \times T2P \leq T \times T2Pmin$? If the answer to step 202 is yes, then execute step 204, is the PA headroom sufficient? If the answer to step 204 is yes, then execute step 214, continue data and overhead transmissions at current power levels in all assigned carriers.

FIG. 10

If the answer to Step 204 is no, then execute step 205 (shown in FIG. 10), throttle DSC power on RL to default level. Then execute step 205A, is PA headroom sufficient? If the answer to step 205A is yes, then execute step 205B, continue data and overhead transmissions at current power levels for all channels on the RL carrier which correspond to all assigned carriers. If the answer to step 205A is no, then execute step 206, throttle the power for the DRCs on the RL which carry information for all carriers on the FL. After executing step 206, execute step 206A, is PA headroom sufficient? If the answer to step 206A is yes, then execute step 206B, continue data and overhead transmissions at current power levels in all assigned carriers. If the answer to step 206A is no, then execute step 208, throttle the power for the ACK channels on the RL which carry information for all carriers on the FL. After executing step 208, execute step 208A, is PA headroom sufficient? If the answer to step 208A is yes, then execute step 208B, continue data and overhead transmissions at current power levels in all assigned carriers. If the answer to step 208A is no, then execute step 210, throttle the Pilot, Data and RRI channel powers on the RL carrier. Return to step 200.

FIG. 9

If the answer to step 202 is no, then execute step 212 (shown in FIG. 9), is the PA headroom sufficient? If the answer to step 212 is yes, then execute step 215, continue data and overhead transmissions at current power levels in all assigned carriers. If the answer to step 212 is no, then execute step 217, throttle data channel power on the RL until $T \times T2P = T \times T2Pmin$ or PA Headroom is sufficient. Return to Step 200.

Multicarrier RL Throttle Rules

The multicarrier throttle rules are applied when $T \times T_{AT} \leq T \times T_{minAT}$ on all. RL carriers, N, assigned to the access terminal 106 and the access terminal 106 is PA headroom limited.

Figure 11:
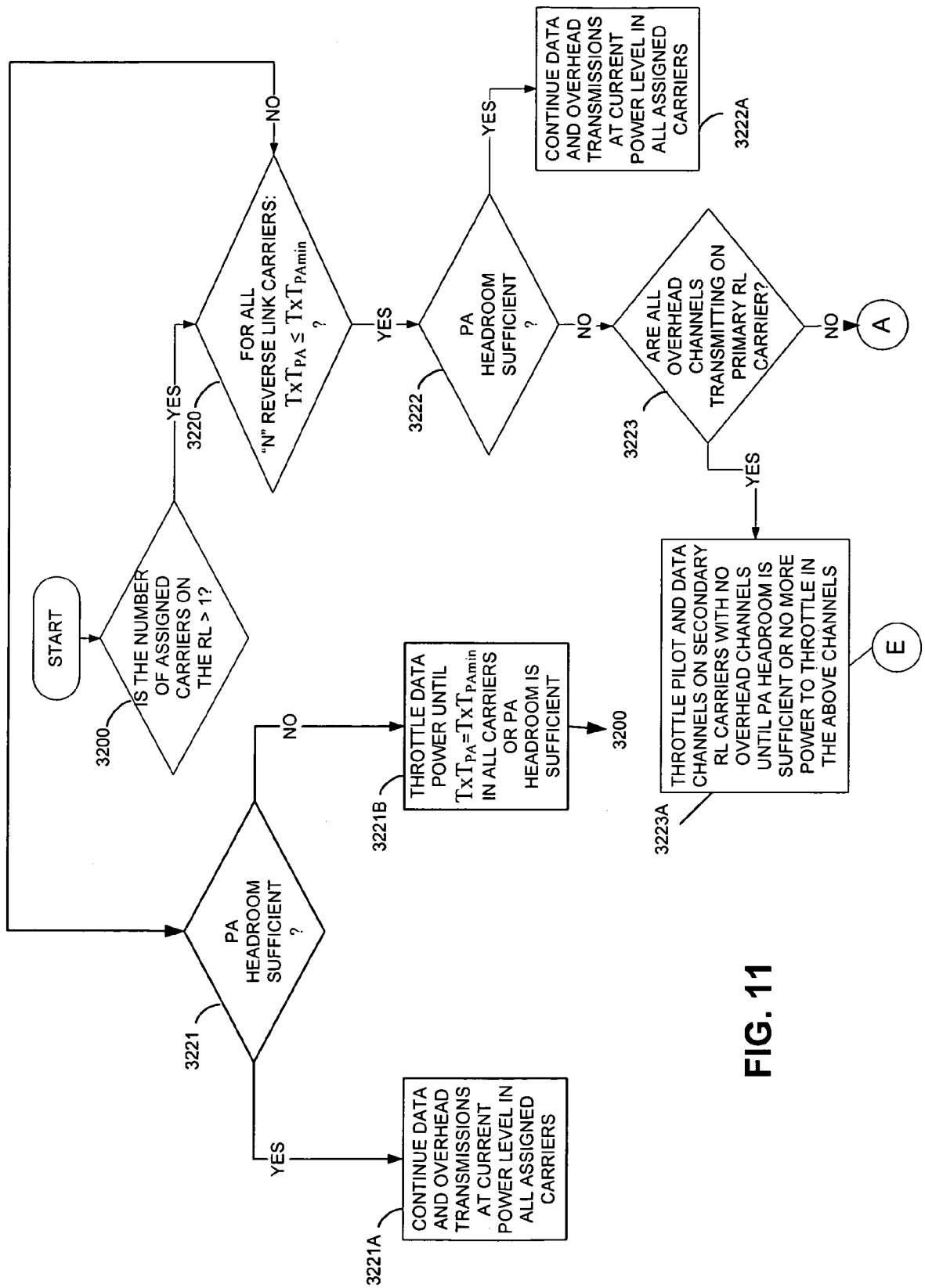
FIG. 11 is a flowchart disclosing steps and FIG. 22 is a similar diagram disclosing certain means that may be executed to reduce the transmit powers input to a power amplifier where the number of assigned reverse link RL carriers is greater than 1.
Figure 12:
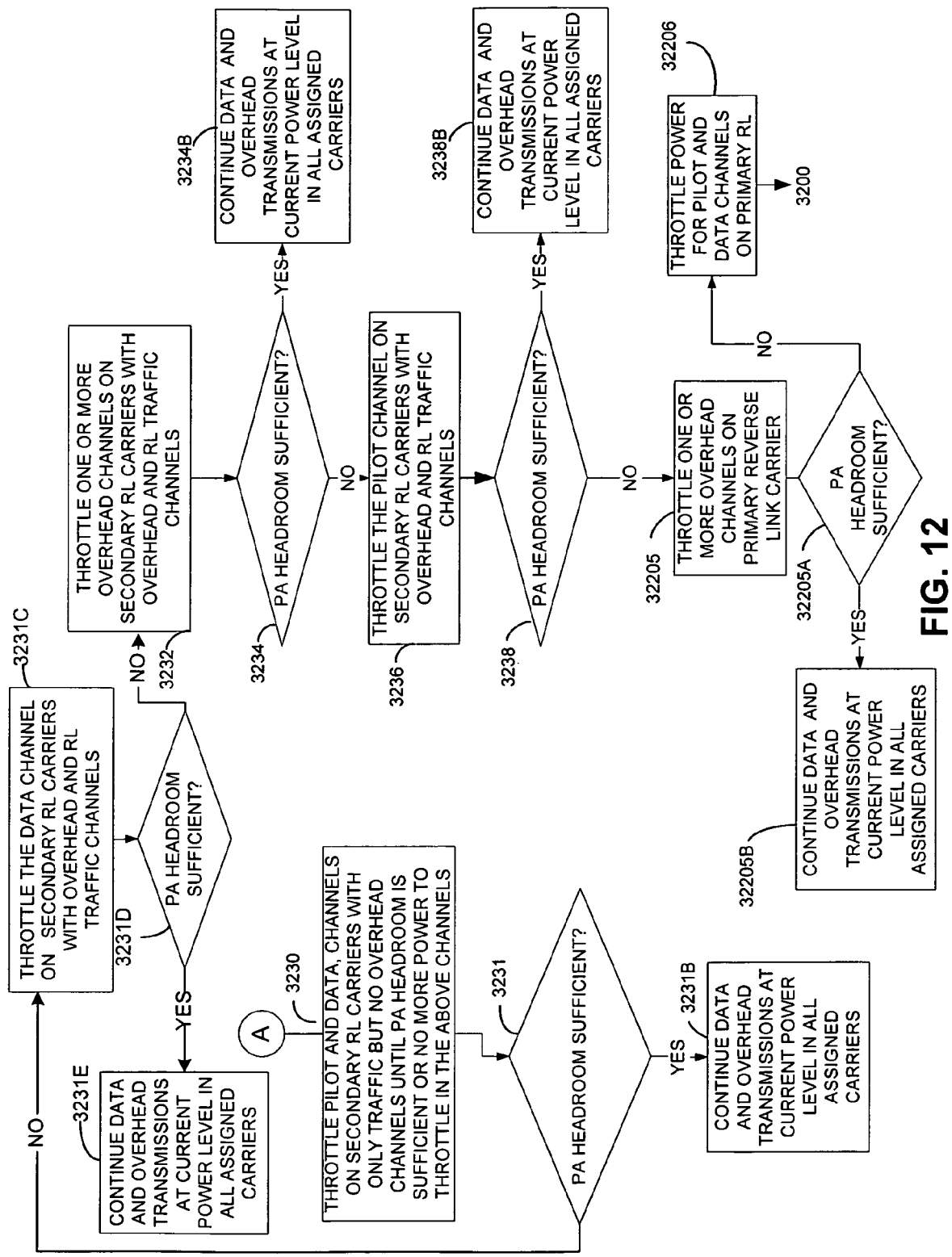
FIG. 12 is a flowchart disclosing steps and FIG. 23 is a similar diagram disclosing certain means that may be executed to reduce the transmit powers input to a power amplifier if transmitting DRC and ACK channels on some secondary reverse link carrier and the PA headroom is not sufficient.

There are two embodiments for the multi-carrier case (N>1): i) where the AT 106 is transmitting overhead channels on some secondary RL carriers, and ii) where the AT 106 is transmitting all overhead channels on the primary reverse link carrier. For the multi-carrier case (N>1) where the AT 106 is transmitting overhead channels on some secondary RL carriers and where for all "N" RL carriers $T \times T2P \leq T \times T2Pmin$ and the PA 308 headroom is not sufficient, throttle the RL power in the following order until PA 308 headroom is sufficient:

1) For secondary RL carriers (with RL traffic only), throttle Pilot and Data channels on the corresponding RL carrier. 2) For secondary RL carriers (with overhead channels and RL traffic), i) throttle the Data channels on the corresponding RL carrier, ii) throttle one or more overhead channels which carry information for all carriers on the FL, and iii) throttle the Pilot and data source channels on the corresponding RL carrier. (The order of i and ii can be reversed). 3) On the primary RL carrier, i) throttle one or more of the overhead channels which carry information for all carriers on the FL, and ii) throttle the Pilot and Data channels on the primary RL carrier. In FIG. 11, this method of throttling power corresponds to the following steps:

FIG. 11

In FIG. 11, execute step 3200, is the number of assigned carriers on the RL>1? If the answer is yes, then execute step 3220, is $T \times T_{PA} \leq T \times T_{PAmin}$ for all RL carriers?

If the answer to step 3220 is no, then execute step 3221, is the PA headroom sufficient? If the answer to step 3221 is yes, then execute step 3221A, continue data and overhead transmissions at current power levels in all assigned carriers. If the answer to step 3221 is no, then execute step 3221B, throttle Data channel power until $T \times T_{PA} = T \times T_{PAmin}$ in all carriers or PA headroom is sufficient. Then return to step 3200.

If the answer to step 3220 is yes, then execute step 3222, is the PA headroom sufficient? If the answer to step 3222 is yes, then execute step 3222A, continue data and overhead transmissions at current power levels in all assigned carriers. If the answer to step 3222 is no, then execute step 3223, are all overhead channels transmitting on the primary RL carrier?

FIG. 12

If the answer to step 3223 is no, then execute step 3230 (shown in FIG. 12), throttle the Pilot and Data channels on the secondary RL carriers with only traffic channels, and no overhead channels, until there is sufficient PA headroom or there is no more power to throttle in the Pilot and Data channels.

After executing step 3230, execute step 3231, is PA headroom sufficient?. If the answer to step 3231 is yes, then execute step 3231B, continue data and overhead transmissions at current power levels in all assigned carriers. If the answer to step 3231 is no, then execute step 3231C, throttle the Data channel on the secondary RL carriers with overhead and RL traffic channels until there is sufficient PA headroom or there is no more power to throttle in the Data channel. After executing step 3231C, execute step 3231D, is PA headroom sufficient? If the answer is to step 3231D is yes, then execute step 3231E, continue data and overhead transmissions at current power levels in all assigned carriers.

If the answer to step 3231D is no, then execute step 3232, throttle the power for one or more overhead channels for secondary RL carriers with overhead and Traffic channels. After executing step 3232, execute step 3234, is PA headroom sufficient? If the answer to step 3234 is yes, then execute step 3234B, continue data and overhead transmissions at current power levels in all assigned carriers. If the answer to step 3234 is no, then execute step 3236, throttle the power for Pilot channels on secondary RL carriers with overhead and Traffic channels.

After executing step 3236, execute step 3238, is PA headroom sufficient? If the answer to step 3238 is yes, then execute step 3238B, continue data and overhead transmissions at current power levels in all assigned carriers. If the answer to step 3238 is no, then execute step 32205, throttle one or more overhead channels on primary reverse link carrier. Then execute step 32205A, is PA headroom sufficient? If the answer to step 32205A is yes, then execute step 32205B, continue data and overhead transmissions at current power levels in all assigned carriers. If the answer to step 32205A is no, then execute step 32206, throttle the power for Pilot and Data channels on the primary RL carrier. Next, return to step 3200.

For the multi-carrier reverse link case (N>1), if transmitting all overhead channels on primary reverse link carrier and for all "N" reverse link carriers $T \times T_{PA} \leq T \times T_{PAmin}$ and PA headroom is not sufficient, throttle RL power in the following order until PA headroom is sufficient:

1) For secondary RL carriers, throttle the Pilot and Data channels on corresponding RL carrier. 2) For primary RL carrier, throttle one or more overhead channels. 3) For the primary RL carrier, throttle the Pilot and Data channels.

Figure 13:
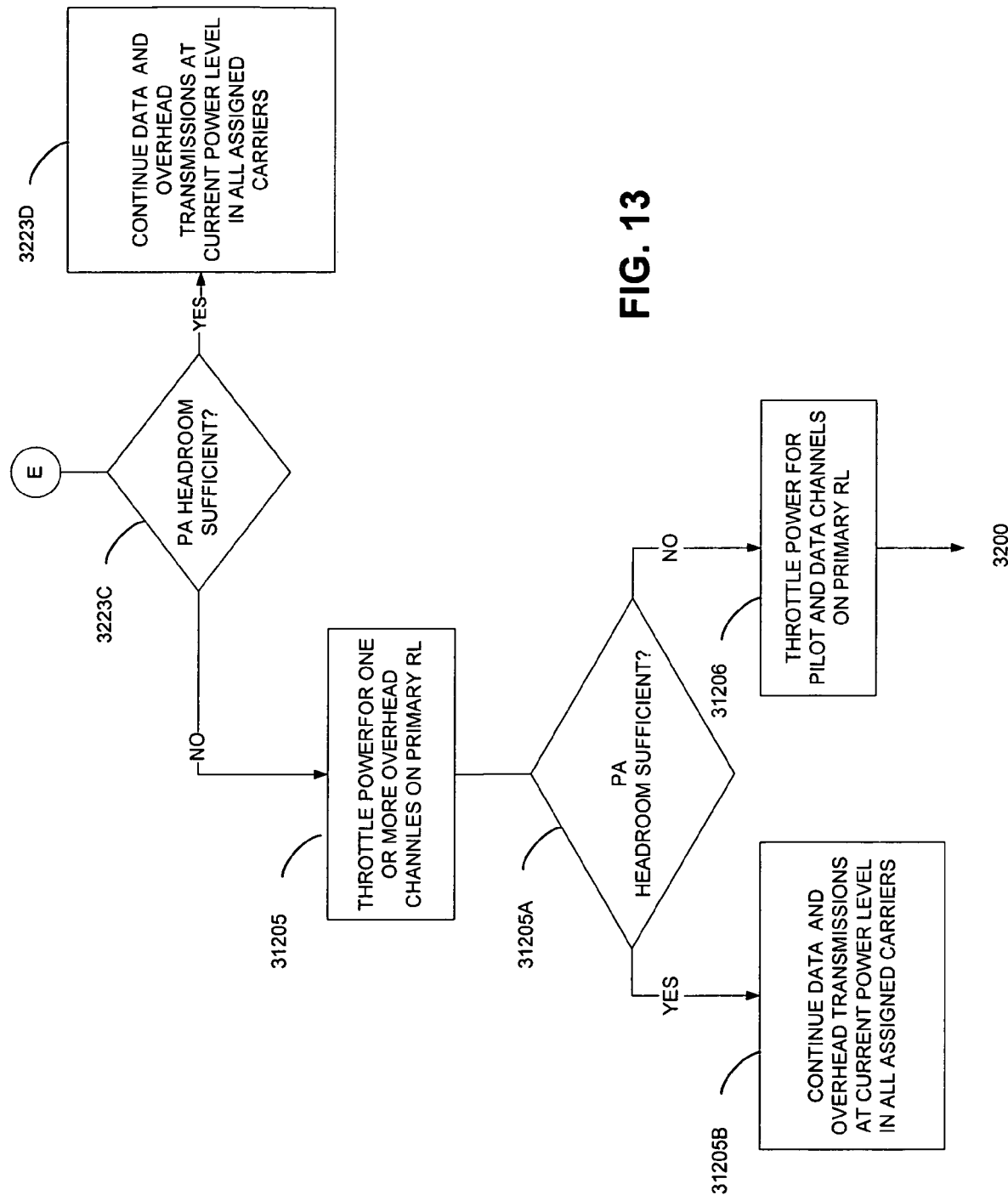
FIG. 13 is a flowchart disclosing steps and FIG. 24 is a similar diagram disclosing certain means that may be executed to reduce the transmit powers input to a power amplifier if transmitting all DRC and ACK channels on primary reverse link carrier and the PA headroom is not sufficient.
Figure 14:
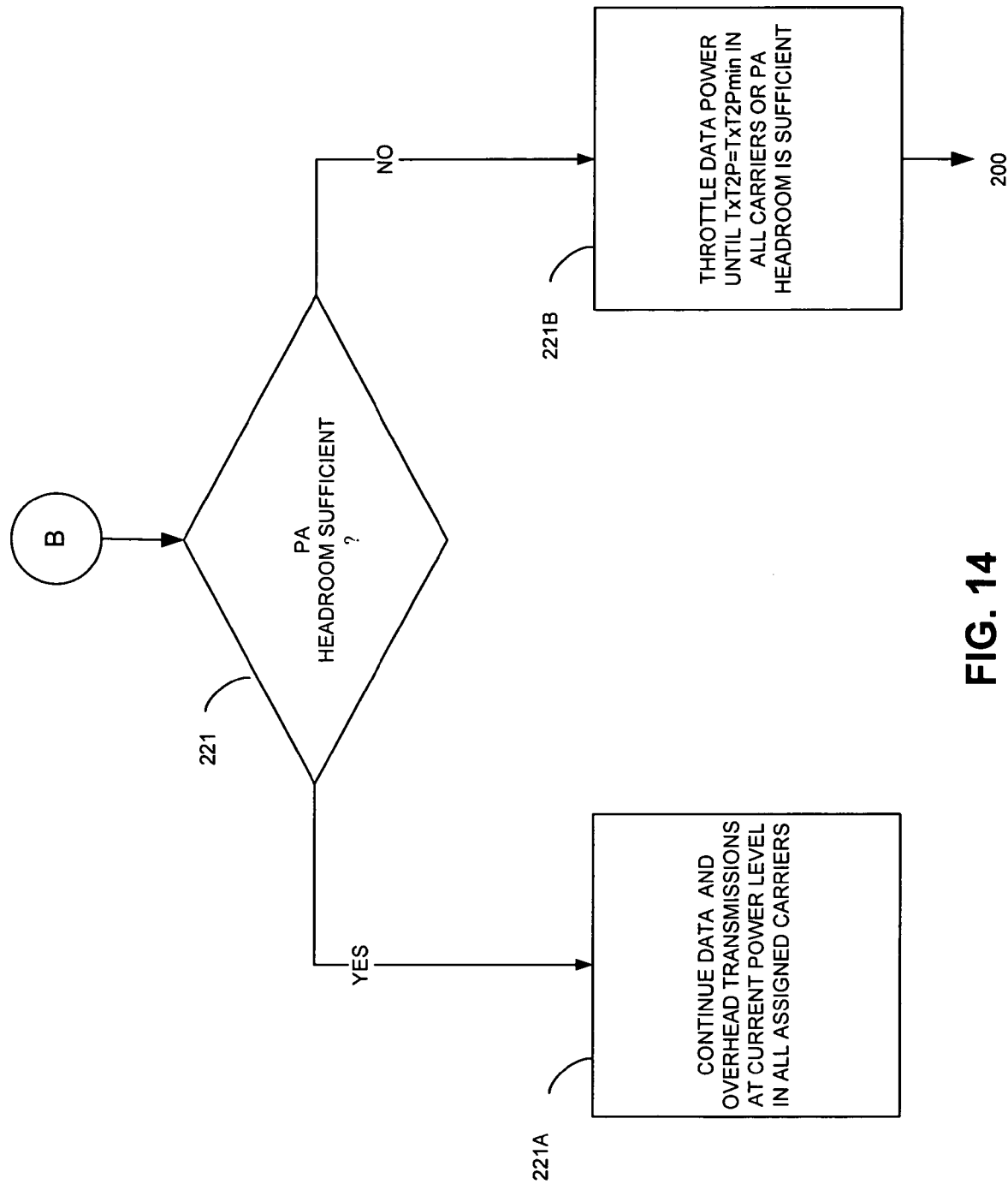
FIG. 14 is a flowchart disclosing steps and FIG. 25 is a similar diagram disclosing certain means that may be executed to reduce the transmit powers input to a power amplifier where the number of assigned reverse link RL carriers is greater than 1 and $T \times T2P \leq T \times T2Pmin$ for all RL carriers.
Figure 15:
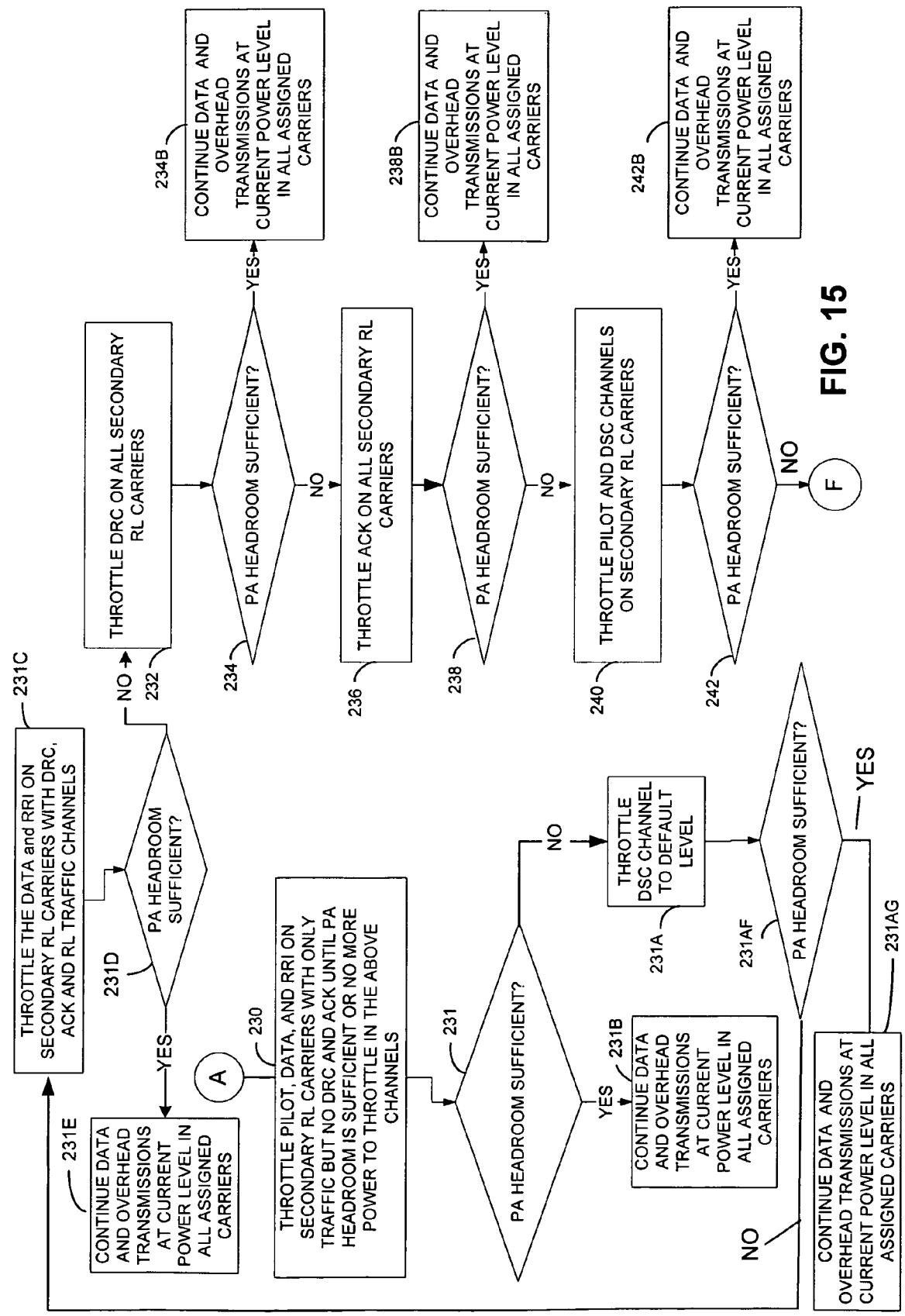
FIG. 15 is a flowchart disclosing steps and FIG. 26 is a similar diagram disclosing certain means that may be executed to reduce the transmit powers input to a power amplifier if transmitting DRC and ACK channels on some secondary reverse link carrier and the PA headroom is not sufficient.
Figure 16:
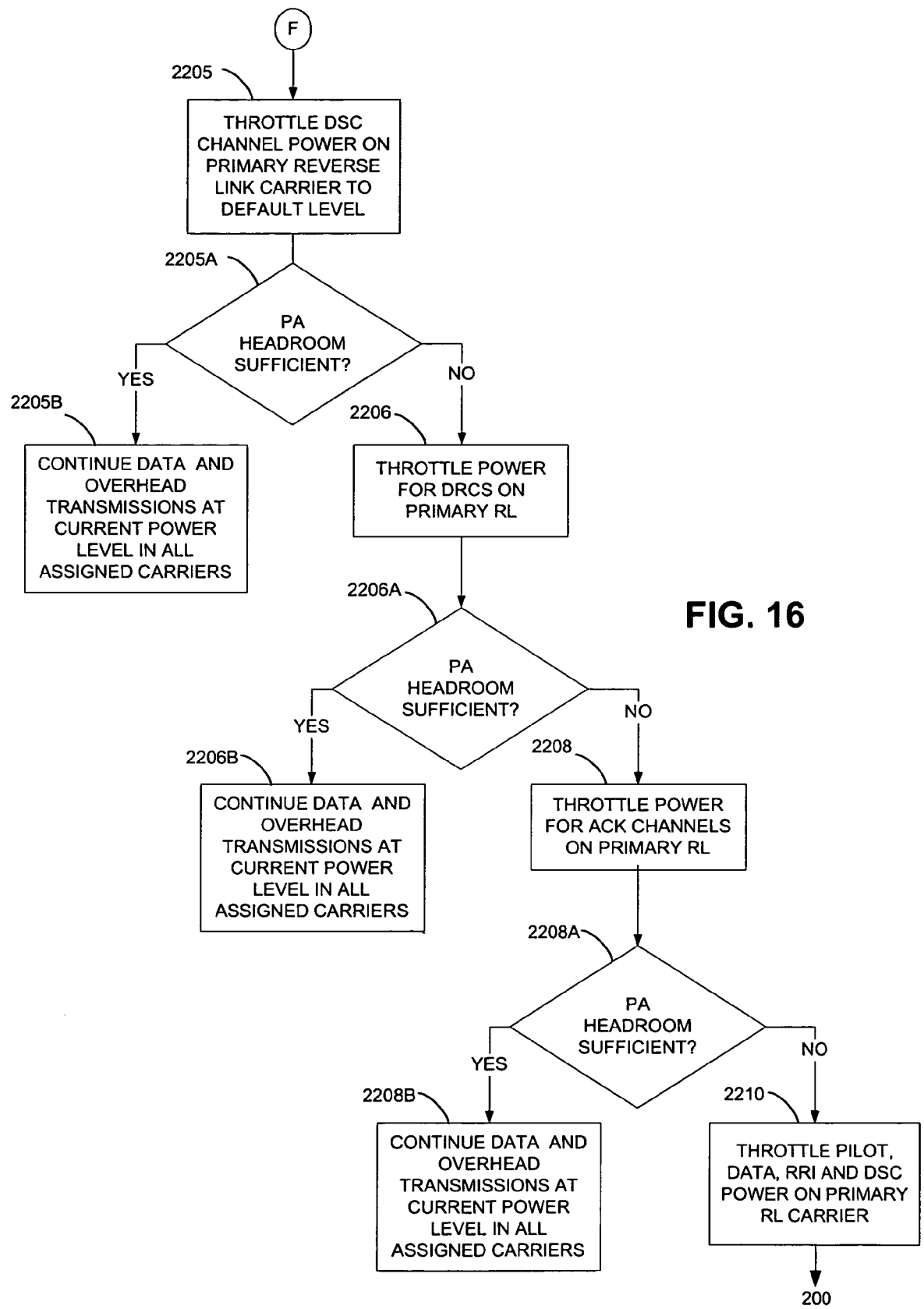
FIG. 16 is a flowchart disclosing steps and FIG. 27 is a similar diagram disclosing certain means that may be executed to reduce the transmit powers input to a power amplifier if transmitting DRC and ACK channels on some secondary reverse link carrier and the PA headroom is not sufficient.

In FIGS. 11 and 13, this method of throttling power corresponds to the following steps:

FIG. 11

In FIG. 11, execute step 3200, is the number of assigned carriers on the RL>1? If yes, then execute step 3220, is $T \times T_{PA} \leq T \times T_{PAmin}$ for all RL carriers? If the answer to step 3220 is yes, then execute step 3222, is the PA headroom sufficient? If the answer to step 3222 is yes, then execute step 3222A, continue data and overhead transmissions at current power levels in all assigned carriers. If the answer to step 3222 is no, then execute step 3223, are all overhead channels transmitting on the primary RL carrier? If the answer to step 3223 is yes, then execute step 3223A, throttle the Pilot and Data channels on the secondary RL carriers with no overhead channels until there is sufficient PA headroom or there is no more power to throttle in the Pilot and Data channels.

FIG. 13

Next, execute step 3223C (shown in FIG. 13), is PA headroom sufficient? If the answer to step 3223C is yes, then execute step 3223D, continue data and overhead transmissions at current power levels in all assigned carriers. If the answer to step 3223C is no, then execute step 31205, throttle the power for one or more overhead channels on the primary RL. After executing step 31205, execute step 31205A, is PA headroom sufficient? If the answer to step 31205A is yes, then execute step 31205B, continue data and overhead transmissions at current power levels in all assigned carriers. If the answer to step 31205A is no, then execute step 31206, throttle the power for Pilot and Data channels on the primary RL. Then, return to step 3200.

In one embodiment, the multicarrier throttle rules are applied when $T \times T2P \leq T \times T2Pmin$ on all RL carriers, N, assigned to the access terminal 106 and the access terminal 106 is PA headroom limited.

For the multi-carrier case (N>1), where the AT is transmitting DRC and ACK channels on some secondary RL carriers, where for all "N" RL carriers $T \times T2P \leq T \times T2Pmin$ and the PA headroom 405 is not sufficient, throttle the RL power-in the following order until PA headroom 405 is sufficient:

1) For secondary RL carriers (with RL traffic only), throttle the Pilot, Data and RRI channels on the corresponding RL carrier. 2) For secondary RL carriers (with DRC, ACK channel and RL traffic), i) throttle the DSC channel down to default level, ii) throttle the Data and RRI channels on the corresponding RL carrier, iii) throttle the DRCs on the corresponding RL carrier which carry information for all carriers on the FL, iv) throttle the ACK channels on the corresponding RL carrier which carry information for all carriers on the FL, and v) throttle the Pilot and DSC channels on the corresponding RL carrier. (In one embodiment, steps iii and iv can come before step ii). 3) On the primary RL carrier, throttle the DSC channel down to default level, throttle power for the DRC channels on the primary RL carrier which carry information for all carriers on the FL, throttle the power for the ACK channels on the primary RL carrier which carry information for all carriers on the FL, and throttle the Pilot, Data and RRI channels on the primary RL carrier. In FIGS. 9, 15, 14 and 16, this method of throttling power corresponds to the following steps:

FIG. 9

In FIG. 9 execute step 200, is the number of assigned carriers on the RL>1? If the answer is yes, then execute step 220, is $T \times T2P \leq T \times T2Pmin$ for all RL carriers?

FIG. 14

If the answer to Step 220 is no, then execute step 221 (shown in FIG. 14), is the PA headroom sufficient? If the answer to step 221 is yes, then execute step 221A, continue data and overhead transmissions at current power levels in all assigned carriers. If the answer to step 221 is no, then execute step 221B, throttle Data channel power until T×T2P=T× T2Pmin in all carriers or PA headroom is sufficient. Then return to step 200.

FIG. 9

If the answer to step 220 is yes, then execute step 222, is the PA headroom sufficient? If the answer to step 222 is yes, then execute step 222A, continue data and overhead transmissions at current power levels in all assigned carriers. If the answer to step 222 is no, then execute step 223, are all DRC and ACK transmitting on the primary RL carrier?

FIG. 15

If the answer to step 223 is no, then execute step 230 (shown in FIG. 15), throttle the Pilot, Data and RRI channels on the secondary RL carriers with only traffic channels, but no DRC or ACK channels, until there is sufficient PA headroom or there is no more power to throttle in the Pilot, Data and RRI channels. After executing step 230, execute step 231, is PA headroom sufficient? If the answer to step 231 is yes, then execute step 231B, continue data and overhead transmissions at current power levels in all assigned carriers. If the answer to step 231 is no, then execute step 231A, throttle the DSC channels on corresponding secondary RL carriers down to default level. Next, execute step 231AF, is PA headroom sufficient? If the answer to step 231AF is yes, then execute step 231AG, continue data and overhead transmissions at current power levels in all assigned carriers.

If the answer to step 231AF is no, then execute step 231C, throttle the Data and RRI channels on the secondary RL carriers with DRC, ACK and RL traffic channels, until there is sufficient PA headroom or there is no more power to throttle in the Data and RRI channels. After executing step 231C, execute step 231D, is PA headroom sufficient? If the answer is to step 231D is yes, then execute step 231E, continue data and overhead transmissions at current power levels in all assigned carriers.

If the answer to step 231D is no, then execute step 232, throttle the power for the DRC channels for all secondary RL carriers. After executing step 232, execute step 234, is PA headroom sufficient? If the answer to step 234 is yes, then execute step 234B, continue data and overhead transmissions at current power levels in all assigned carriers. If the answer to step 234 is no, then execute step 236, throttle the power for the ACK channels on all secondary RL carriers. After executing step 236, execute step 238, is PA headroom sufficient? If the answer to step 238 is yes, then execute step 238B, continue data and overhead transmissions at current power levels in all assigned carriers. If the answer to step 238 is no, then execute step 240, throttle the power for the Pilot and DSC channels on corresponding secondary RL carriers. After executing step 240, execute step 242, is PA headroom sufficient? If the answer to step 242 is yes, then execute step 242B, continue data and overhead transmissions at current power levels in all assigned carriers.

FIG. 16

If the answer to step 242 is no, then execute step 2205 (shown in FIG. 16), throttle the DSC channel power on primary reverse link carrier to a default level. Then execute step 2205A, is PA headroom sufficient? If the answer to step 2205A is yes, then execute step 2205B, continue data and overhead transmissions at current power levels in all assigned carriers. If the answer to step 2205A is no, then execute step 2206, throttle the power for DRCs on the primary RL which carry information for all carriers on the FL. After executing step 2206, execute step 2206A, is PA headroom sufficient? If the answer to step 2206A is yes, then execute step 2206B, continue data and overhead transmissions at current power levels in all assigned carriers. If the answer to step 2206A is no, then execute step 2208, throttle the power for the ACK channels on the primary RL which carry information for all carriers on the FL. After executing step 2208, execute step 2208A, is PA headroom sufficient? If the answer to step 2208A is yes, then execute step 2208B, continue data and overhead transmissions at current power levels in all assigned carriers. If the answer to step 2208A is no, then execute step 2210, throttle Pilot, Data, RRI and DSC channel powers on the primary RL carrier. Next, return to step 200.

For the multi-carrier reverse link case (N>1), and if transmitting all DRC and ACK channels on primary reverse link carrier and for all "N" reverse link carriers T×T2P≦T× T2Pmin and PA headroom is not sufficient, throttle RL power in the following order until PA headroom is sufficient:

1) For secondary RL carriers, throttle the Pilot, Data, and RRI channels on corresponding RL carrier. 2) For primary RL carrier, throttle the DSC down to default level. Throttle the power for DRCs on the primary RL which carry information for all carriers on the FL. Throttle the power for ACK channels on the primary RL carrier which carry information for all carriers on the FL. Throttle the Pilot, Data, RRI and DSC channels on primary RL carrier.

Figure 17:
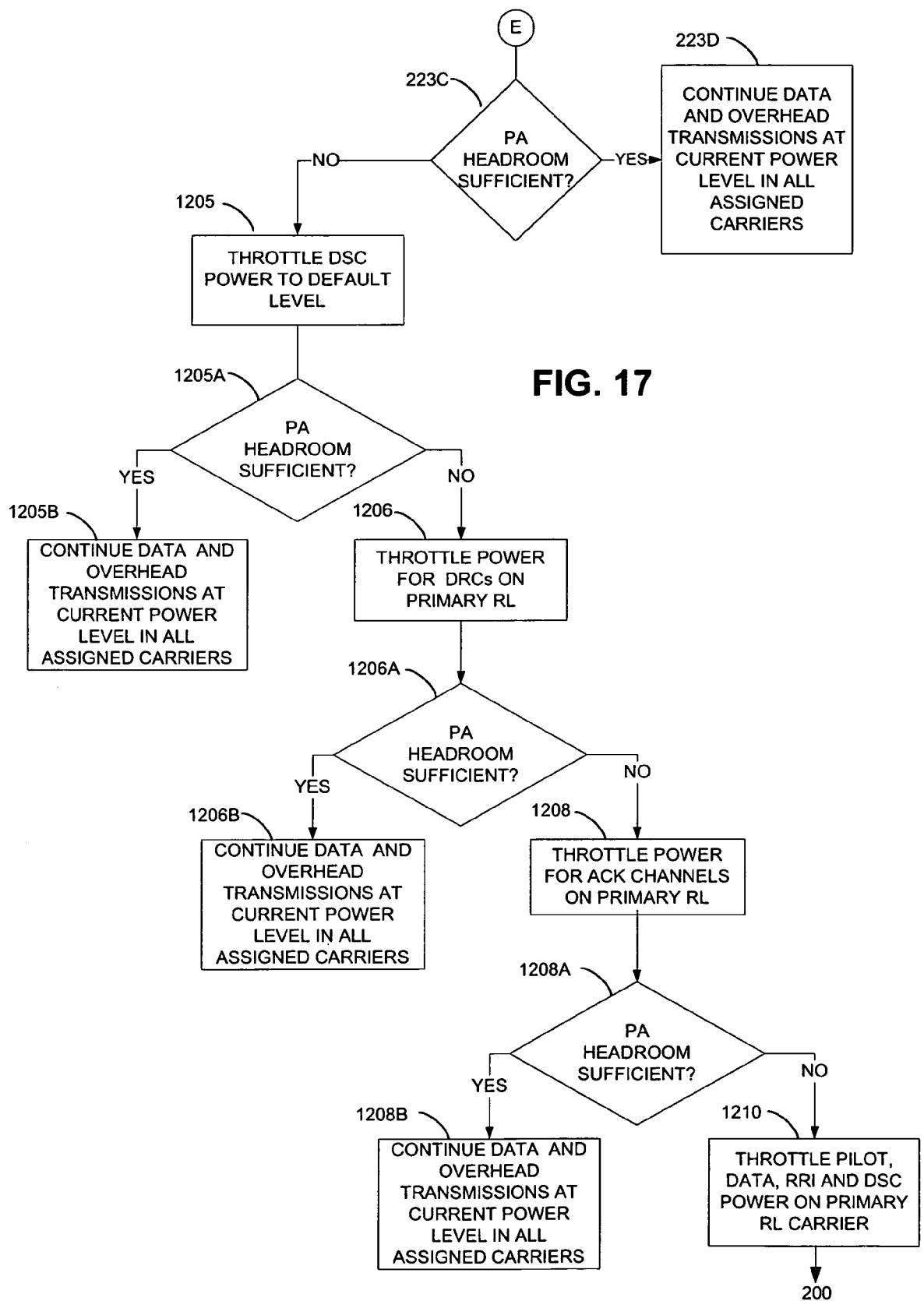
FIG. 17 is a flowchart disclosing steps and FIG. 28 is a similar diagram disclosing certain means that may be executed to reduce the transmit powers input to a power amplifier if transmitting all DRC and ACK channels on primary reverse link carrier and the PA headroom is not sufficient.

In FIGS. 9 and 17, this method of throttling power corresponds to the following steps:

FIG. 9

In FIG. 9, execute step 200, is the number of assigned carriers on the RL>1? If yes, then execute step 220, is T×T2P≦T×T2Pmin for all RL carriers? If the answer to step 220 is yes, then execute step 222, is the PA headroom sufficient? If the answer to step 222 is yes, then execute step 222A, continue data and overhead transmissions at current power levels in all assigned carriers. If the answer to step 222 is no, then execute step 223, are all DRC and ACK transmitting on the primary RL carrier? If the answer to step 223 is yes, then execute step 223A, throttle the Pilot, Data and RRI channels on the secondary RL carriers until there is sufficient PA headroom or there is no more power to throttle in the Pilot, Data and RRI channels.

FIG. 17

Next, execute step 223C (shown in FIG. 17), is PA headroom sufficient? If the answer to step 223C is yes, then execute step 223D, continue data and overhead transmissions at current power levels in all assigned carriers. If the answer to step 223C is no, then execute step 1205, throttle the DSC power to default level.

Next, execute step 1205A, is PA headroom sufficient? If the answer to step 1205A is yes, then execute step 1205B, continue data and overhead transmissions at current power levels in all assigned carriers. If the answer to step 1205A is no, then execute step 1206, throttle the power for DRCs on the primary RL which carry information for all carriers on the FL. After executing step 1206, execute step 1206A, is PA headroom sufficient? If the answer to step 1206A is yes, then step 1206B, continue data and overhead transmissions at current power levels in all assigned carriers. If the answer to step 1206A is no, then execute step 1208, throttle the power for ACK channels on the primary RL which carry information for all carriers on the FL. After executing step 1208, execute step 1208A, is PA headroom sufficient? If the answer to step 1208A is yes, then execute step 1208B, continue data and overhead transmissions at current power levels in all assigned carriers. If the answer to step 1208A is no, then execute step 1210, throttle the Pilot, Data, RRI and DSC channel powers on the primary RL carrier. Then, return to step 200.

FIG. 7 illustrates an embodiment of an AT 106 according to the present patent application including transmit circuitry 264 (including PA 308), receive circuitry 8408, throttle control 306, decode process unit 258, processing unit 302, DTX control unit 8404, RRI control unit 8406, DRC control unit 8412 and memory 8416. The throttle control unit 306 implements at least one set of throttle rules, such as those illustrated above. Throttle rules provide means and methods for controlling transmit power on the RL. The steps illustrated in FIGS. 8-17 and 19-28 may be stored as instructions located as software or firmware 42 located in memory 8416. These instructions may be executed by the processing unit 302.

Figure 18:
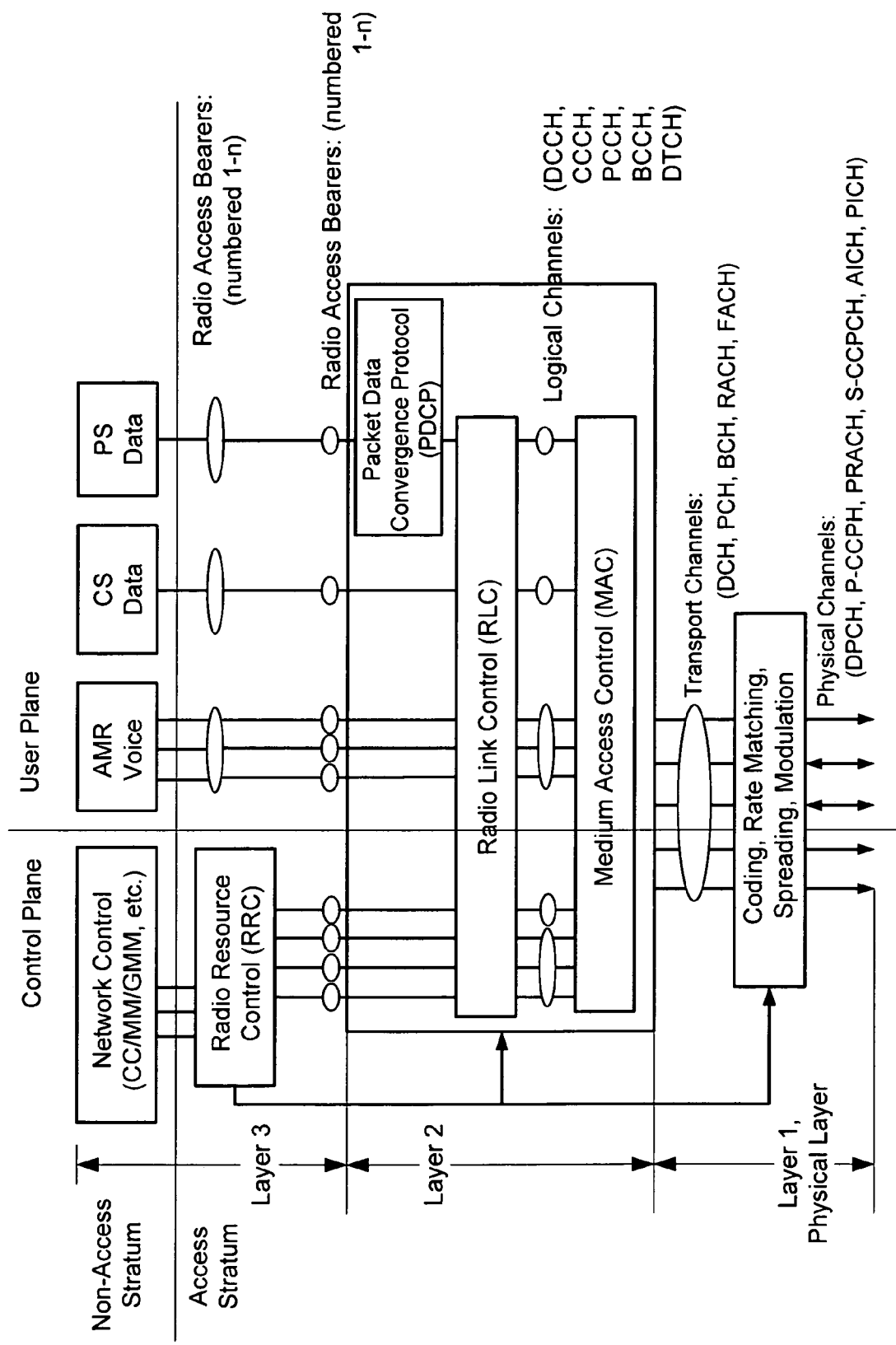
FIG. 18 is an example of a WCDMA protocol structure known in the art.
Figure 19:
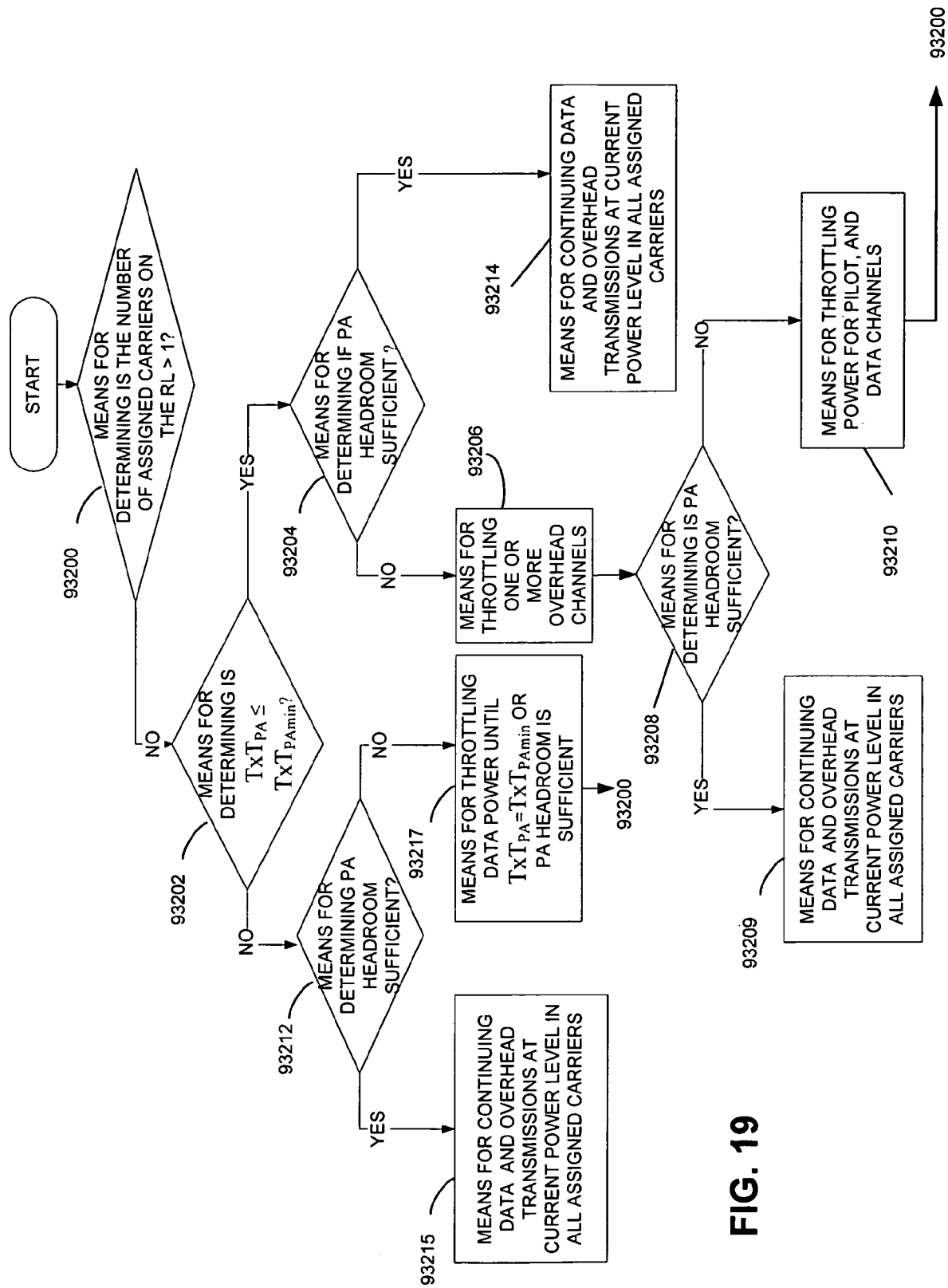
Figure 20:
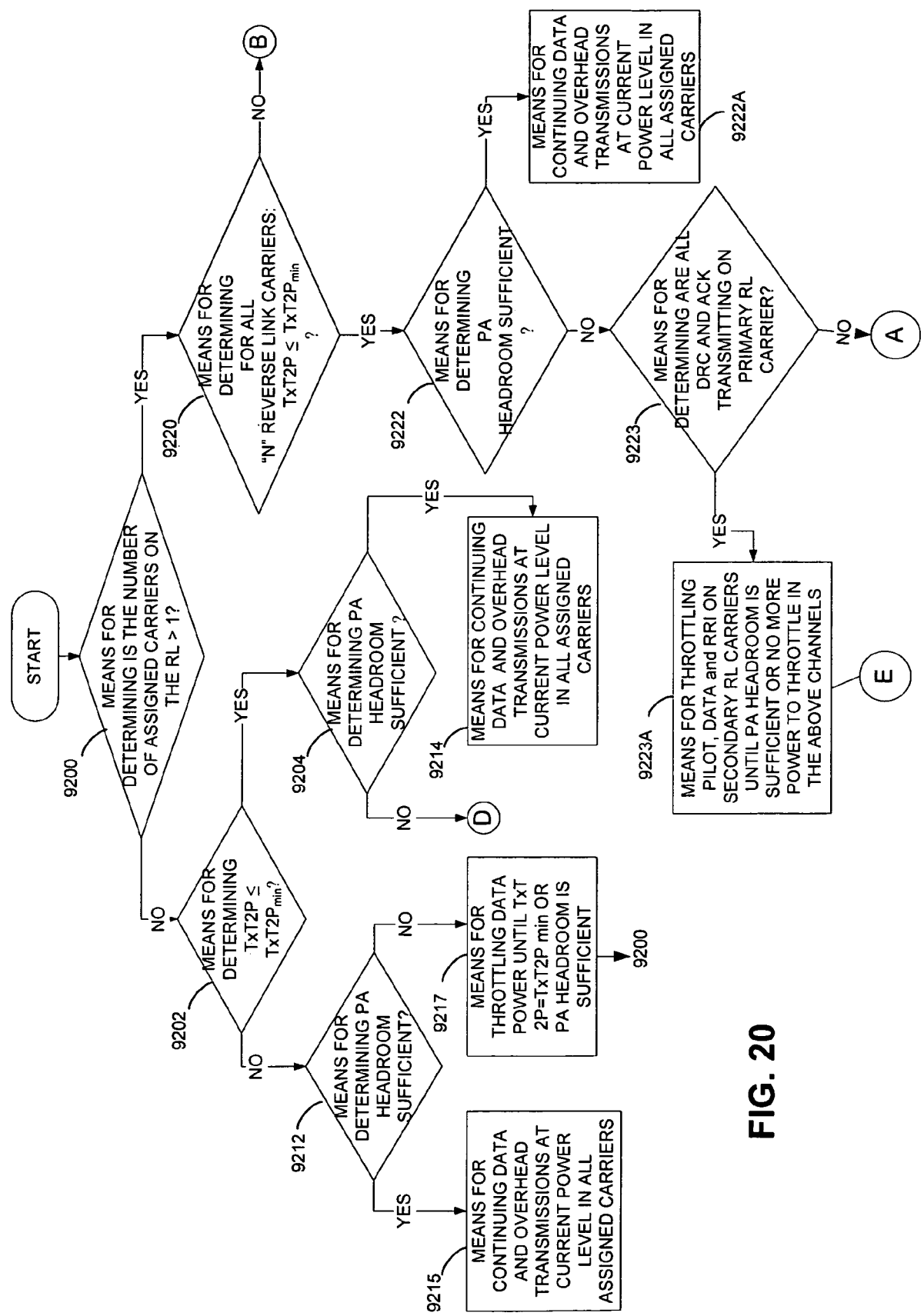
Figure 21:
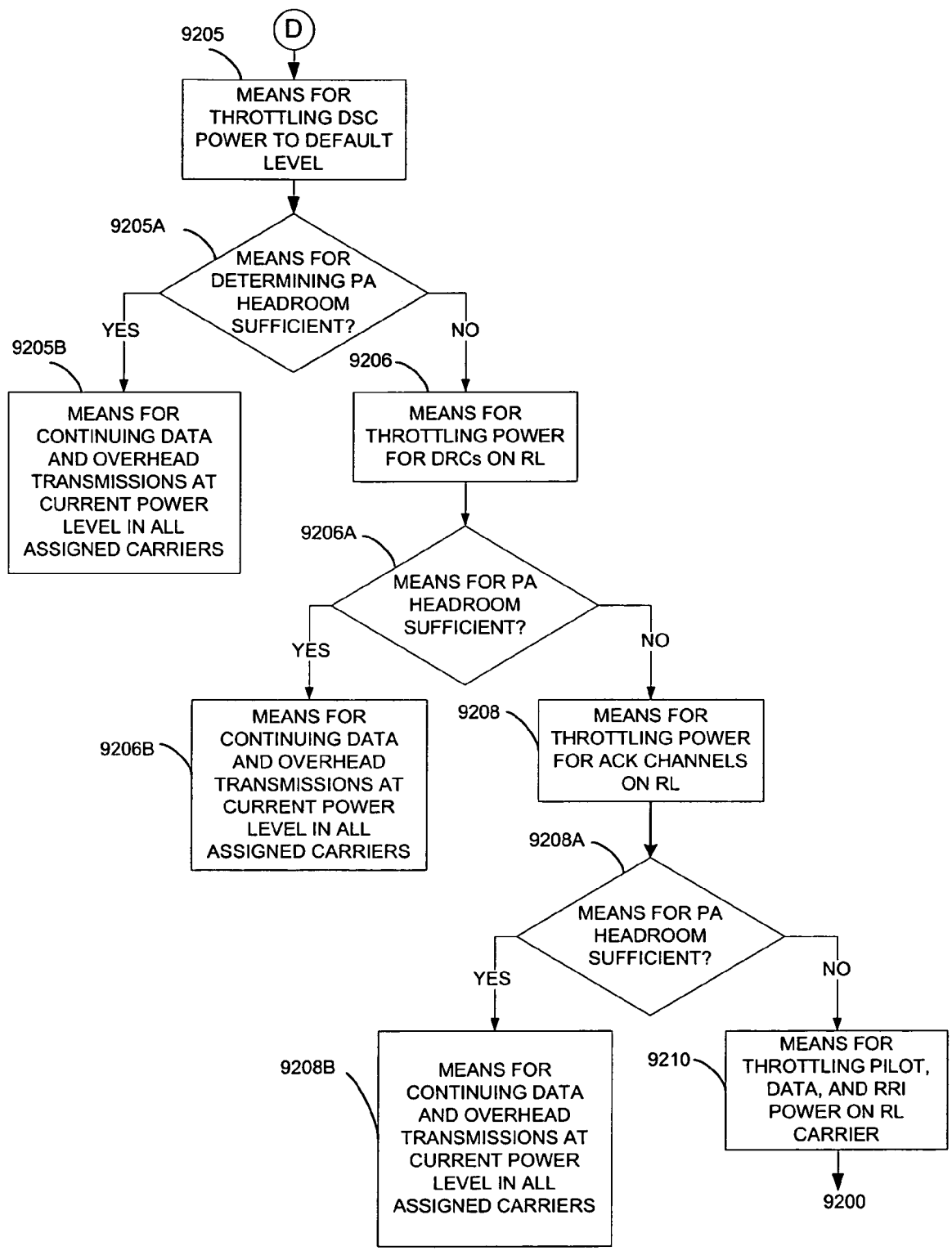
Figure 22:
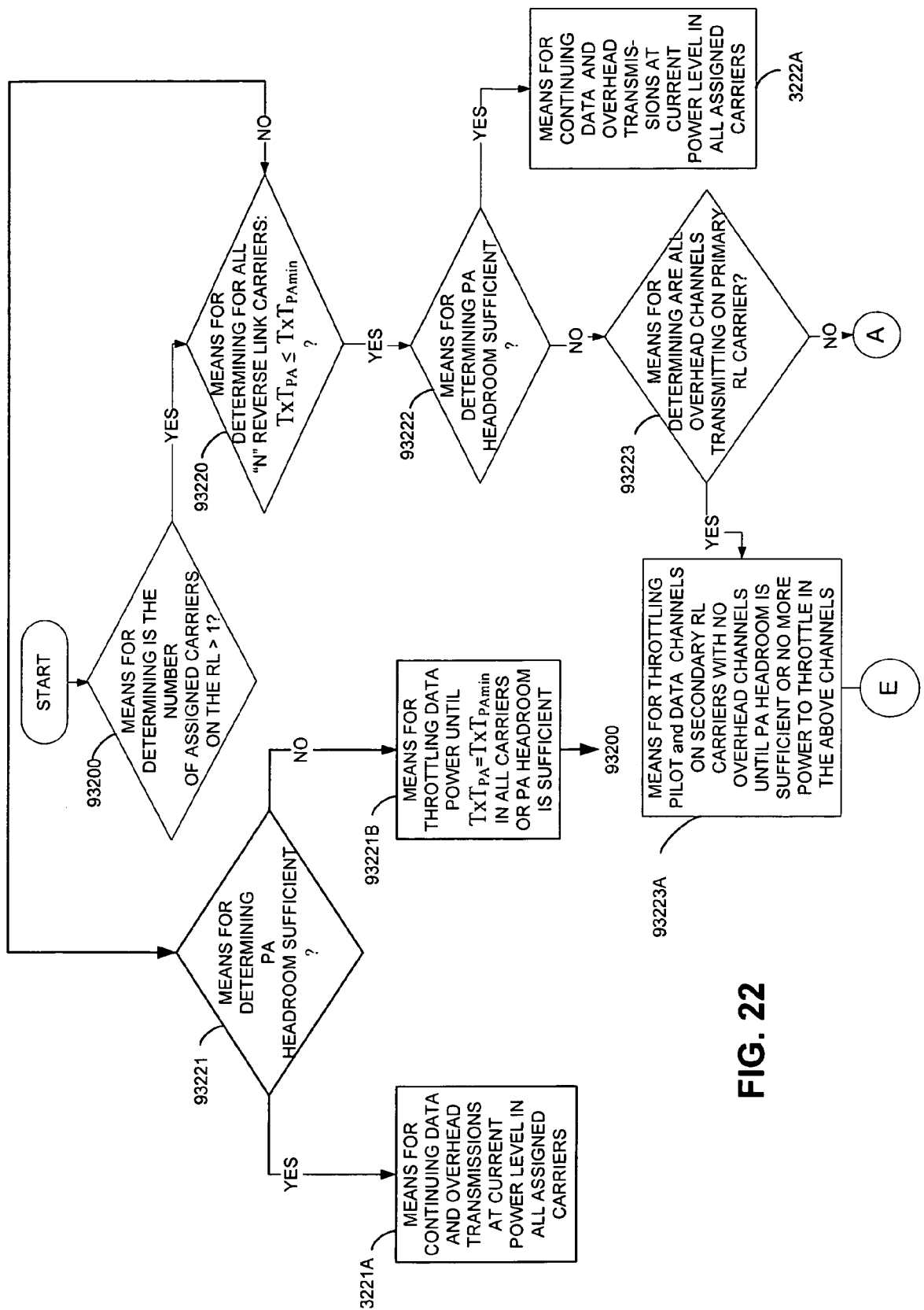
Figure 23:
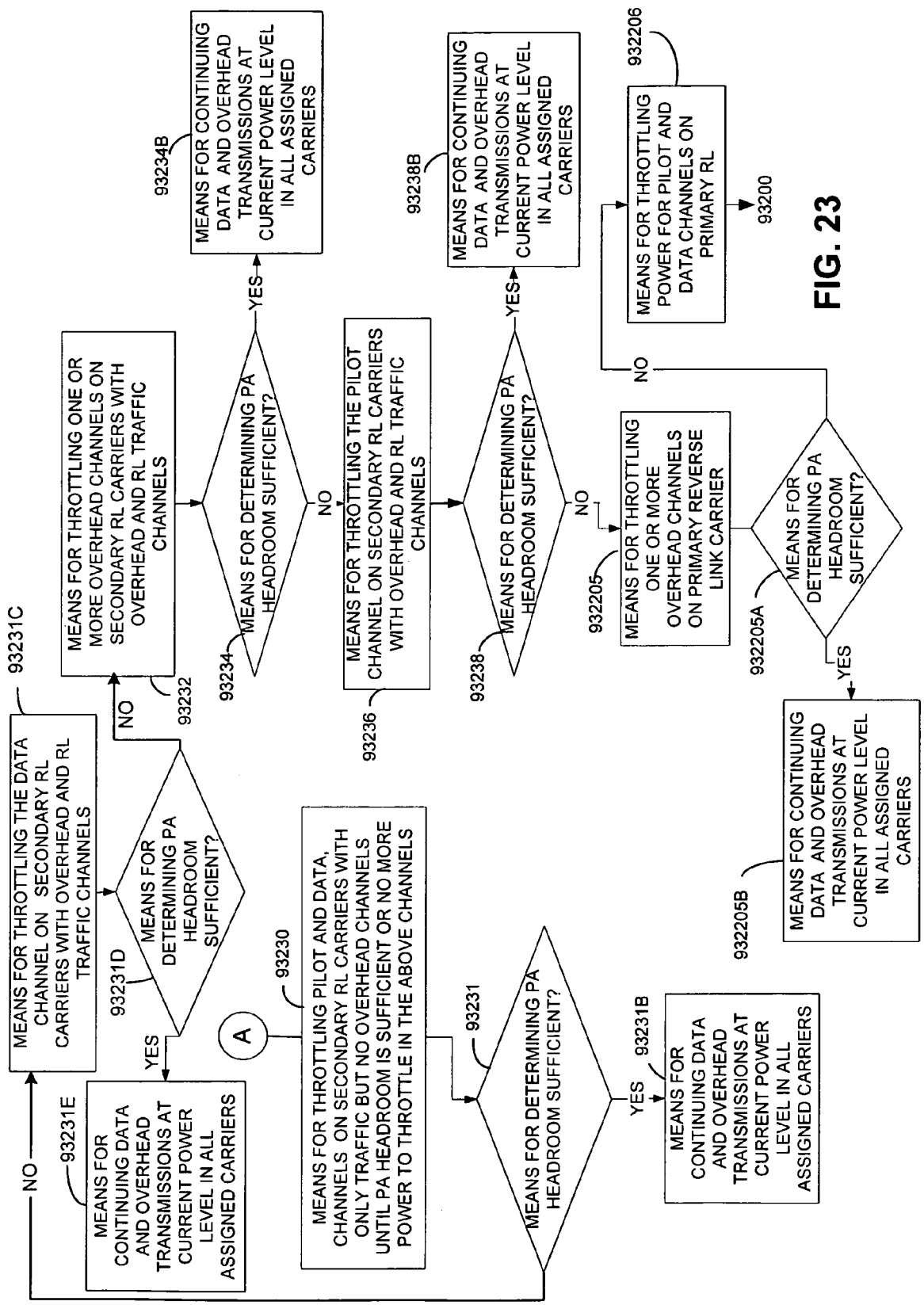
Figure 24:
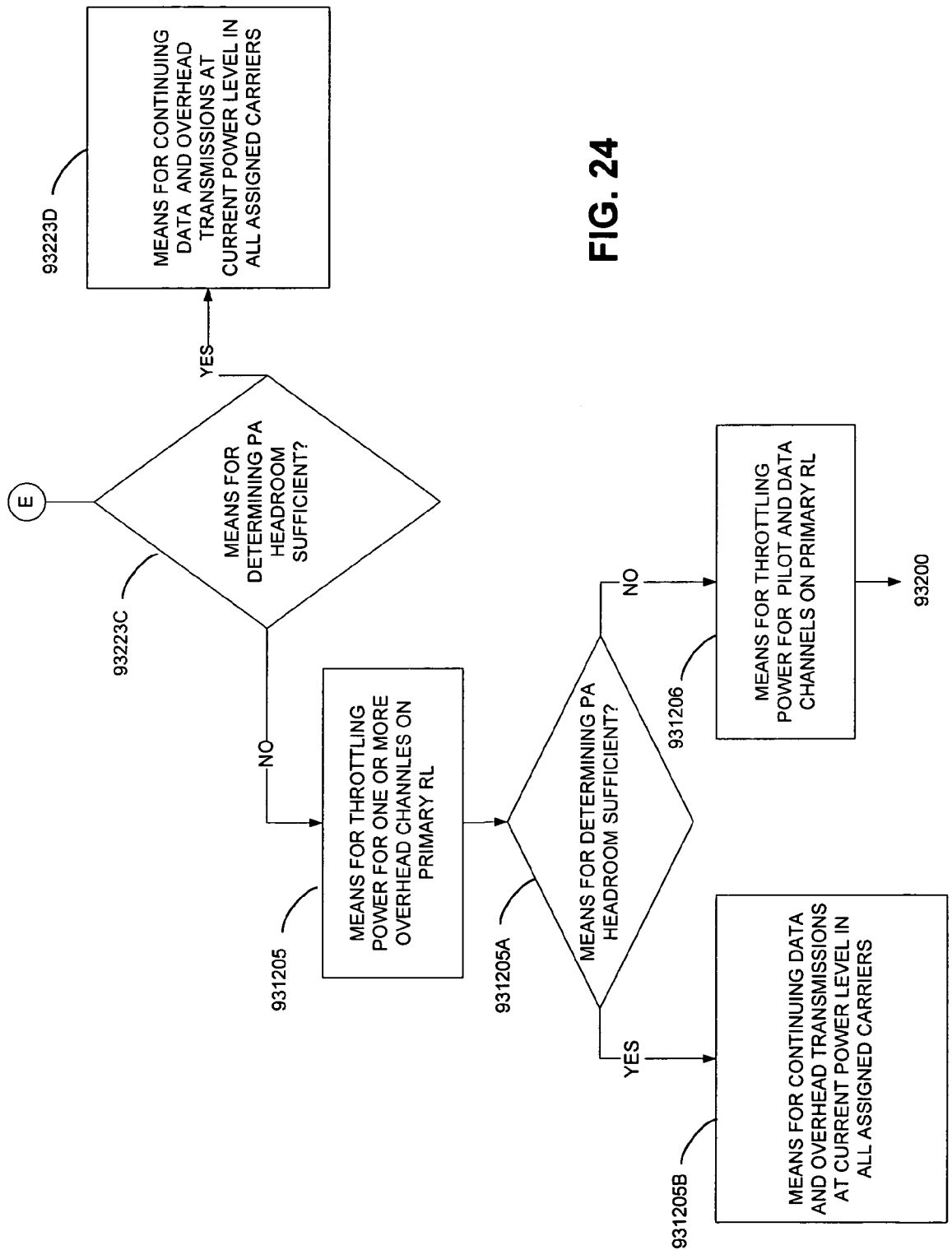
Figure 25:
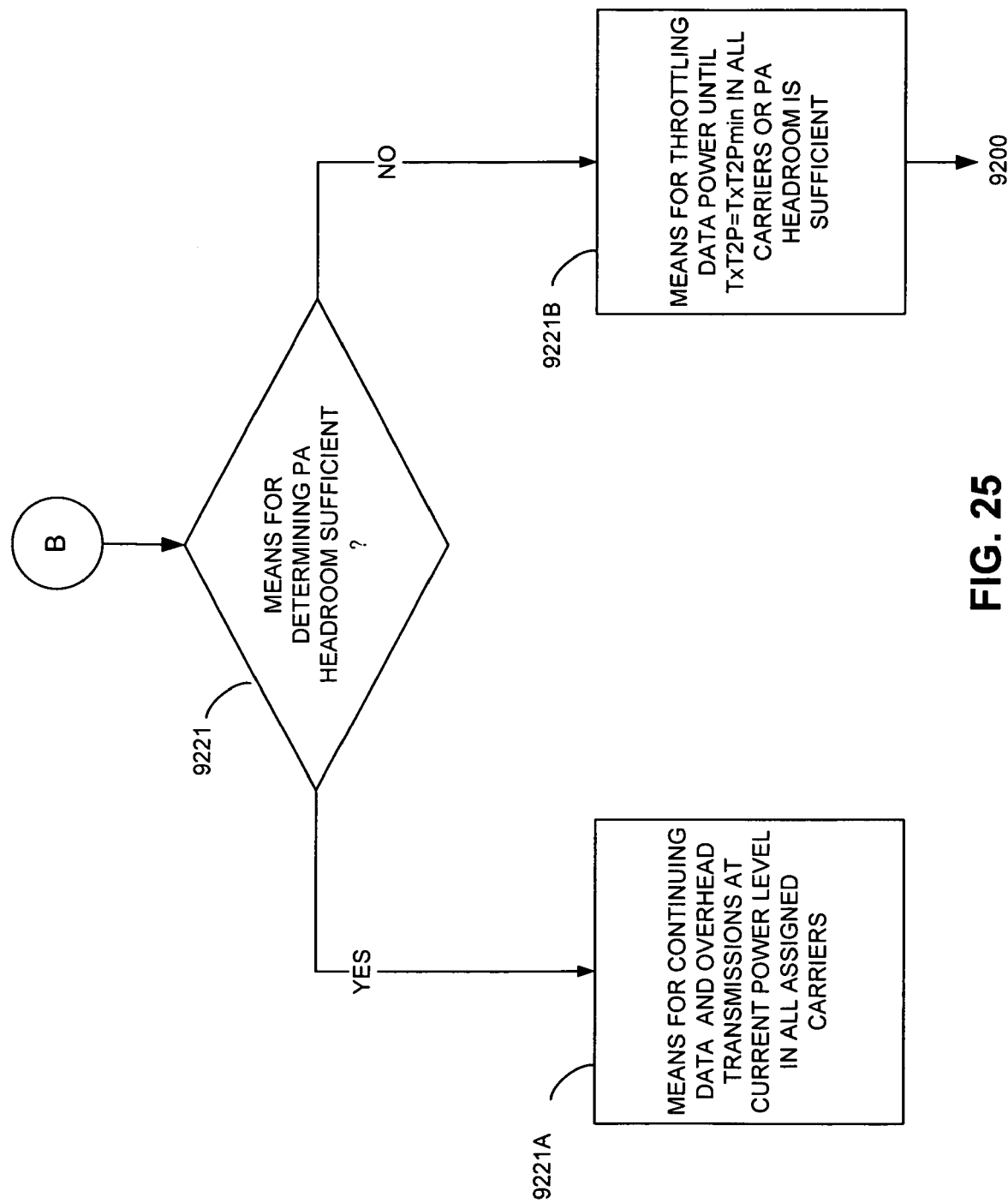
Figure 26:
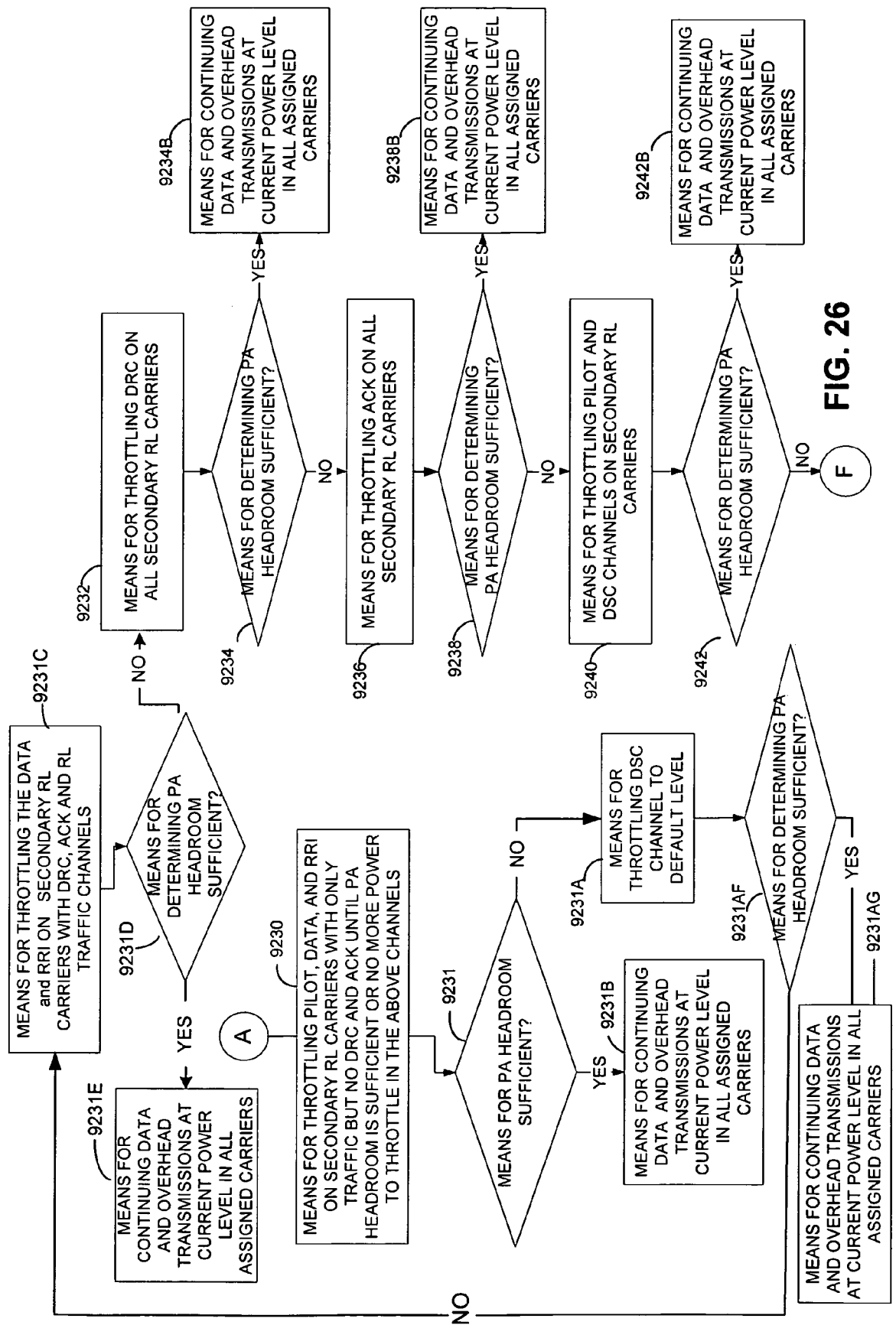
Figure 27:
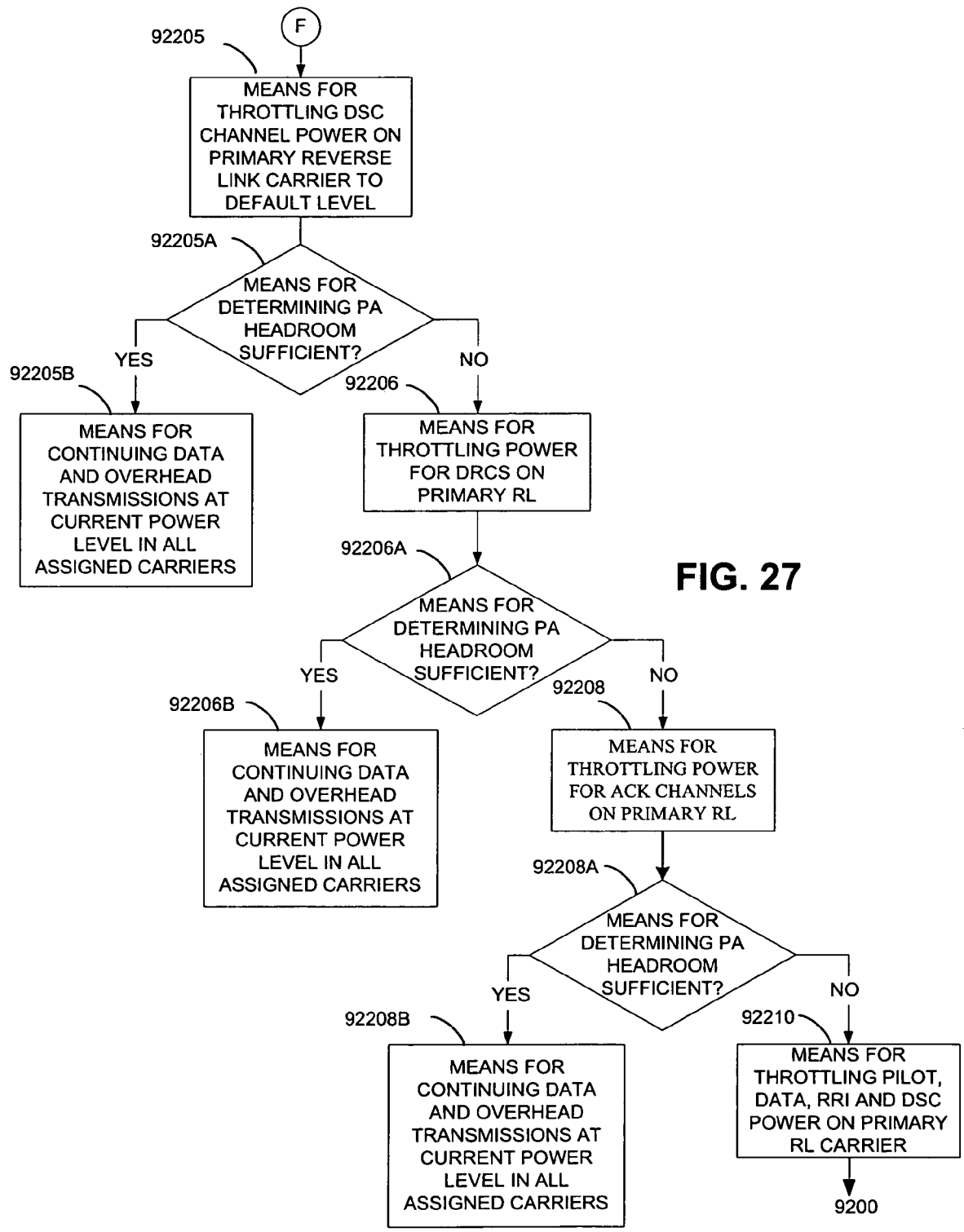
Figure 28:
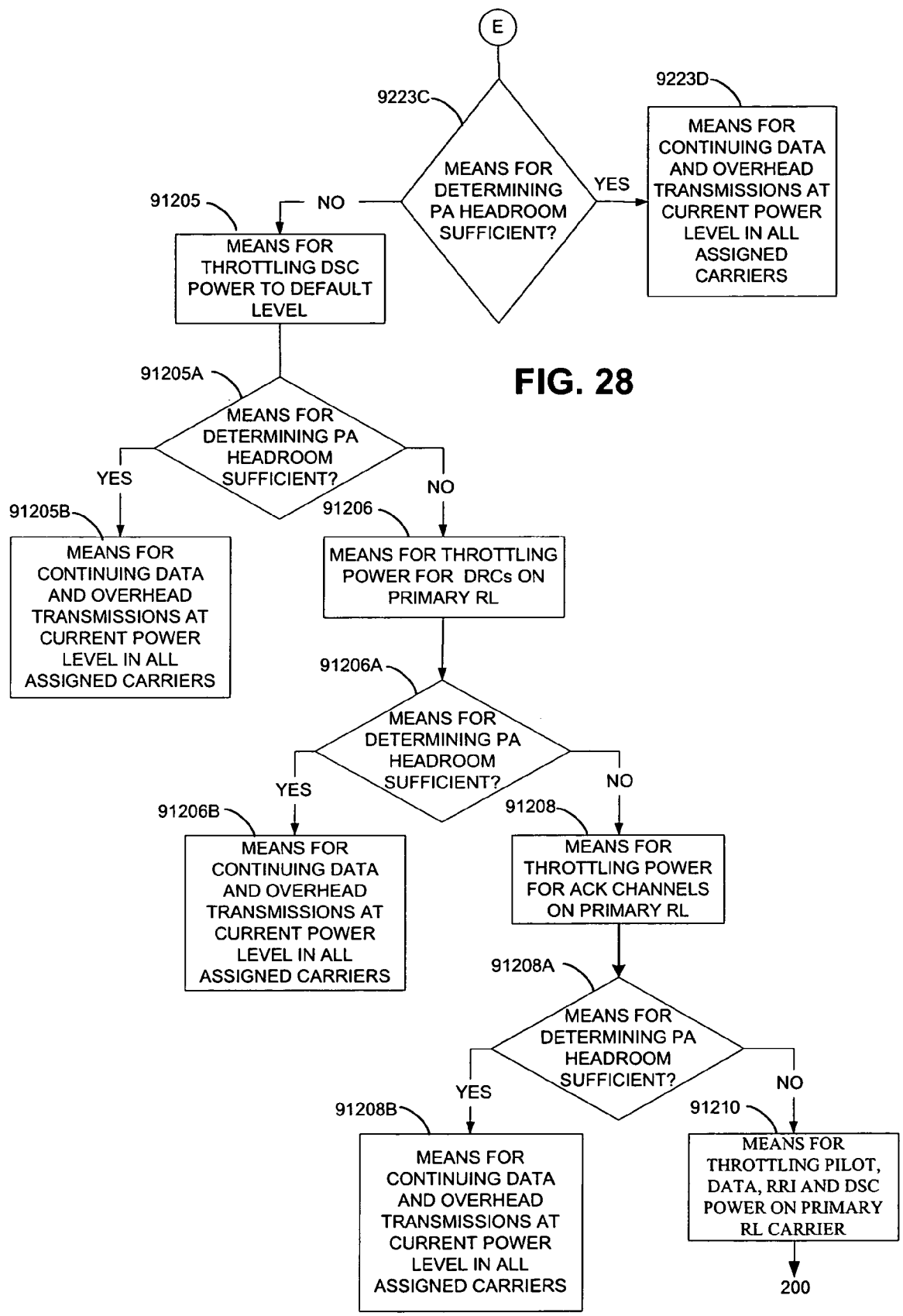

In another embodiment, the above RL power throttling rules disclosed above and illustrated in FIGS. 8-17, may be used with a WCDMA system, such as release 6 which contains traffic channels (i.e., voice and data), pilot and overhead channels. The uplink (which is WCDMA's version of reverse link) channels may include a dedicated physical channel (DPCH), a physical random access channel (PRACH), a dedicated channel (DCH), a random access channel (RACH), a dedicated control channel (DCCH), and a common control channel (CCCH). The DPCH consists of the dedicated physical data channel (DPDCH) which carriers the user data, and the dedicated physical control channel (DPCCH), which carries the physical layer control information (pilot data, TFCI and TPC). FIG. 18 is an example of a WCDMA protocol structure known in the art.

It is also noted that the methods and apparatuses of FIGS. 7-17 described above are performed by corresponding means plus function blocks illustrated in FIGS. 19-28.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal, comprising:
   a transmit circuit having a power amplifier used in both single carrier and multi-carrier operations; and
   a throttle control unit operatively connected to said transmit circuit and operatively enabled according to one or more throttle rules establishing a throttling order to signal said transmit circuit to selectively throttle power of one or more portions of an RF signal that is input to said power amplifier to maintain sufficient power amplifier headroom for said power amplifier.

2. The access terminal according to claim 1, wherein said transmit circuit transmits said RF signal over a reverse link.

3. The access terminal according to claim 2, wherein said reverse link comprises a single carrier, and wherein said throttling order operatively enables said throttle control unit to signal said transmit circuit to selectively:
   throttle power for at least one overhead channel on said reverse link until there is sufficient power amplifier headroom or at least one data rate control channel power has been throttled down; and then, if sufficient power amplifier headroom is not provided,
   throttle one or more of a pilot and data channel powers until there is sufficient power amplifier headroom.

4. The access terminal according to claim 2, wherein said reverse link comprises a single carrier, and wherein said throttling order operatively enables said throttle control unit to signal said transmit circuit to selectively:
   throttle a data source control channel power down to a default level;
   throttle power for at least one data rate control channel on said reverse link until there is sufficient power amplifier headroom or the at least one data rate control channel power has been throttled down;

throttle power for at least one acknowledgment channel on said reverse link carrier until there is sufficient power amplifier headroom or said at least one acknowledgment channel power has been throttled down; and throttle one or more of the pilot, data, reverse rate indicator and said data source control channel powers until there is sufficient power amplifier headroom.

5. The access terminal according to claim 2, wherein said reverse link comprises multiple carriers, and wherein said throttling order operatively enables said throttle control unit to signal said transmit circuit to selectively:

throttle power of at least one secondary reverse link carrier; and then, if needed, throttle power of a primary reverse link carrier.

6. The access terminal according to claim 2, wherein said one or more overhead channels comprises one or more of the following channels: a data source control channel, a data rate control channel, an acknowledgment channel, a pilot channel1 and a reverse rate indicator channel.

7. The access terminal according to claim 2, wherein said throttling order operatively enables said throttle control unit to signal said transmit circuit to selectively:

throttle at least one traffic channel.

8. The access terminal according to claim 2, wherein said throttling order operatively enables said throttle control unit to signal said transmit circuit to selectively:

throttle at least one pilot channel.

9. The access terminal according to claim 2, wherein throttling order operatively enables said throttle control unit to signal said transmit circuit to selectively:

throttle at least one traffic channel and at least one pilot channel.

10. The access terminal according to claim 5, wherein said throttling order operatively enables said throttle control unit to signal said transmit circuit to selectively:

throttle one or more of pilot, data, and reverse rate indicator channel powers.

11. The access terminal according to claim 5, wherein said throttling order operatively enables said throttle control unit to signal said transmit circuit to selectively throttle power of said at least one secondary reverse link carrier before throttling power of said primary reverse link carrier, wherein said throttling order operatively enables said throttle control unit to signal said transmit circuit to selectively throttle power of said at least one secondary reverse link carrier according to a sequence comprising:

throttling one or more of pilot, data, and reverse rate indicator channel powers; and wherein said throttling order operatively enables said throttle control unit to signal said transmit circuit to selectively to throttle power of a primary reverse link carrier according to a sequence comprising:

throttling a data source control channel power down to a default level;

throttling power for at least one data rate control channel on said reverse link carrier until there is sufficient power amplifier headroom or the at least one data rate control channel power has been throttled down; then, if sufficient power amplifier headroom is not provided, throttling power for at least one acknowledgment channel on said reverse link cater until there is sufficient power amplifier headroom or said at least one acknowledgment channel power has been throttled down; and then, if sufficient power amplifier headroom is not provided, throttling one or more of the pilot, data, reverse rate indicator and said data source control channel powers until there is sufficient power amplifier headroom.

12. The access terminal according to claim 5, wherein said throttling order operatively enables said throttle control unit to signal said transmit circuit to selectively throttle power of at least one secondary reverse link carrier by:

throttling one or more of pilot and data channel powers.

13. The access terminal according to claim 5, wherein said throttling order operatively enables said throttle control unit to signal said transmit circuit to selectively throttle power of at least one secondary reverse link carrier by throttling one or more of pilot and data channel powers; and wherein said throttling order operatively enables said throttle control unit to signal said transmit circuit to selectively throttle power of a primary reverse link carrier by:

throttling power for at least one overhead channel on said primary reverse link carrier until there is sufficient power amplifier headroom or the at least one data rate control channel power has been throttled down; and then, if sufficient power amplifier headroom is not provided, throttling one or more of the pilot and data channel powers until there is sufficient power amplifier headroom.

14. The access terminal according to claim 5, wherein said throttling order operatively enables said throttle control unit to signal said transmit circuit to selectively throttle power of at least one secondary reverse link carrier by:

throttling one or more of pilot, data, and reverse rate indicator channel powers on a first secondary carrier; then, if needed, throttling power for a data source control down to a default level on a second secondary carrier; then, if sufficient power amplifier headroom is not provided, throttling power for one or more of the data and reverse rate indicator channel powers on said second secondary carrier until there is sufficient power amplifier headroom or the data and reverse rate indicator channel powers have been throttled down; then, if sufficient power amplifier headroom is not provided, throttling power for at least one data rate control channel on said second secondary carrier until there is sufficient power amplifier headroom or the at least one data rate control channel power has been throttled down; then, if sufficient power amplifier headroom is not provided, throttling power for at least one acknowledgement channel on said second secondary carrier until there is sufficient power amplifier headroom or the acknowledgement channel power has been throttled down; and then, if sufficient power amplifier headroom is not provided, throttling power for at least one pilot channel and said data source control channel on said second secondary carrier until there is sufficient power amplifier headroom or the at least one pilot and the data source control channel powers have been throttled down.

15. The access terminal according to claim 5, wherein said throttling order operatively enables said throttle control unit to signal said transmit circuit to selectively throttle power of said at least one secondary reverse link carrier before throttling power of said primary reverse link carrier;

wherein said throttling order operatively enables said throttle control unit to signal said transmit circuit to selectively throttle power of at least one secondary reverse link carrier according to a sequence comprising;

throttling one or more of pilot, data, and reverse rate indicator channel powers on a first secondary carrier; then, if sufficient power amplifier headroom is not provided, throttling power for a data source channel on a second secondary carrier; then if sufficient power amplifier headroom is not provided, throttling power for one or more of the data and reverse rate indicator channel powers on said second secondary carrier; then, if sufficient power amplifier headroom is not provided, throttling power for at least one data rate control channel on said second secondary carrier; then, if sufficient power amplifier headroom is not provided, throttling power for at least one acknowledgement channel on said second secondary carrier; then, if sufficient power amplifier headroom is not provided, throttling power for at least one pilot channel and said data source channel on said second secondary carrier; and then, if sufficient power amplifier headroom is not provided, wherein said throttling order operatively enables said throttle control unit to signal said transmit circuit to selectively throttle power of a primary reverse link carrier according to another sequence comprising:

throttling a data source control channel power down to a default then, if sufficient power amplifier headroom is not provided, throttling power for at least one data rate control channel on said primary reverse link carrier until there is sufficient power amplifier headroom or the at least one data rate control channel power has been throttled down; then, if sufficient power amplifier headroom is not provided, throttling power for at least one acknowledgment channel on said primary reverse link carrier until there is sufficient power amplifier headroom or said at least one acknowledgment channel power has been throttled down; and then, if sufficient power amplifier headroom is not provided, throttling one or more of the pilot, data, reverse rate indicator and said data source control channel powers until there is sufficient power amplifier headroom.

16. The access terminal according to claim 5, wherein said throttling order operatively enables said throttle control unit to signal said transmit circuit to selectively throttle power of at least one secondary reverse link carrier by:

throttling one or more pilot and data channel powers on a first secondary carrier; then, if sufficient power amplifier headroom is not provided, throttling power for one or more data channel powers on a second secondary carrier; and then, if sufficient power amplifier headroom is not provided, throttling power for at least one overhead channel on said second secondary carrier.

17. The access terminal according to claim 5, wherein said throttling order operatively enables said throttle control unit to signal said transmit circuit to selectively throttle power of at least one secondary reverse link carrier by:

throttling one or more pilot and data channel powers on a first secondary carrier; then, if sufficient power amplifier headroom is not provided, throttling power for one or more of data channel powers on a second secondary carrier; then, if sufficient power amplifier headroom is not provided, throttling power for at least one overhead channel on said second secondary carrier; and then, if sufficient power amplifier headroom is not provided, wherein said throttling order operatively enables said throttle control unit to signal said transmit circuit to selectively to throttle power of a primary reverse link carrier by:

throttling power for at least one overhead channel on said primary reverse link carrier until there is sufficient power amplifier headroom or the at least one data rate control channel power has been throttled down; and then, if sufficient power amplifier headroom is not provided, throttling one or more of the pilot and data channel powers until there is sufficient power amplifier headroom.

18. An apparatus for throttling power over a reverse link, comprising:

means for establishing an RF signal suitable for amplification by a power amplifier that is operatively enabled for use in both single carrier and multi-carrier operations;

means for establishing one or more throttle rules establishing a throttling order associated with one or more overhead channels, one or more data channels, and/or one or more pilot channels of said one or more carriers; and means for selectively throttling power of one or more portions of said RF signal prior to being input to said power amplifier to maintain sufficient power amplifier headroom for said power amplifier, said means for selectively throttling power being operatively responsive to said throttling order.

19. The apparatus for throttling power over a reverse link according to claim 18, wherein said reverse link comprises a single carrier and wherein responsive to said throttling order said means for selectively throttling power is operatively enabled to selectively:

throttle power for at least one overhead channel on said reverse link carrier until there is sufficient power amplifier headroom or at least one data rate control channel power has been throttled down; and then, if sufficient power amplifier headroom is not provided, throttle one or more of a pilot and data channel powers until there is sufficient power amplifier headroom.

20. The apparatus for throttling power over a reverse link according to claim 18, wherein said reverse link comprises a single carrier and wherein responsive to said throttling order said means for selectively throttling power is operatively enabled to selectively:

throttle a data source control channel power down to a default level; then, if sufficient power amplifier headroom is not provided, throttle power for at least one data rate control channel on said reverse link carrier until there is sufficient power amplifier headroom or the at least one data rate control channel power has been throttled down; then, if sufficient power amplifier headroom is not provided, throttle power for at least one acknowledgment channel on said reverse link carrier until there is sufficient power amplifier headroom or said at least one acknowledgment channel power has been throttled down; and then, if sufficient power amplifier headroom is not provided, throttle one or more of the pilot, data, reverse rate indicator and said data source control channel powers until there is sufficient power amplifier headroom.

21. The apparatus for throttling power over a reverse link according to claim 18, wherein said reverse link comprises a single carrier and wherein responsive to said throttling order said means for selectively throttling power is operatively enabled to selectively:

throttle power of at least one secondary reverse link carrier; and then, if needed throttle power of a primary reverse link carrier.

22. The apparatus for throttling power over a reverse link according to claim 18 wherein said one or more overhead channels comprises one or more of the following channels: a data source control channel, a data rate control channel, an acknowledgment channel, a pilot channels and a reverse rate indicator channel.

23. The apparatus for throttling power over a reverse link according to claim 18 wherein responsive to said throttling order said means for selectively throttling power is operatively enabled to selectively throttle at least one traffic channel.

24. The apparatus for throttling power over a reverse link according to claim 18 wherein responsive to said throttling order said means for selectively throttling power is operatively enabled to selectively throttle at least one pilot channel.

25. The apparatus for throttling power over a reverse link according to claim 18 wherein responsive to said throttling order said means for selectively throttling power is operatively enabled to selectively throttle at least one traffic channel and at least one pilot channel.

26. The apparatus for throttling power over a reverse link according to claim 21, wherein said means for throttling power of at least one secondary reverse link carrier comprises:

means for throttling one or more of pilot, data, and reverse rate indicator channel powers.

27. The apparatus means for throttling power over a reverse link according to claim 21, wherein responsive to said throttling order said means for selectively throttling power is operatively enabled to selectively throttle power of at least one secondary reverse link carrier prior to throttling power of a primary reverse link carrier, wherein responsive to said throttling order said means for selectively throttling power is operatively enabled to selectively throttle power of at least one secondary reverse link carrier by throttling one or more of pilot, data, and reverse rate indicator channel powers; and wherein responsive to said throttling order said means for selectively throttling power is operatively enabled to selectively throttle power of a primary reverse link carrier by throttling power in accordance with a sequence comprising:

throttling a data source control channel power down to a default level; then, if sufficient power amplifier headroom is not provided, throttling power for at least one data rate control channel on said reverse link carrier until there is sufficient power amplifier headroom or the at least one data rate control channel power has been throttled down; then, if sufficient power amplifier headroom is not provided, throttling power for at least one acknowledgment channel on said reverse link carrier until there is sufficient power amplifier headroom or said at least one acknowledgment channel power has been throttled down; and then, if sufficient power amplifier headroom is not provided, throttling one or more of the pilot, data, reverse rate indicator and said data source control channel powers until there is sufficient power amplifier headroom.

28. The apparatus for throttling power over a reverse link according to claim 21, wherein responsive to said throttling order said means for selectively throttling power is operatively enabled to selectively throttle:

one or more of pilot and data channel powers.

29. The apparatus for throttling power over a reverse link according to claim 21, wherein responsive to said throttling order said means for selectively throttling power is operatively enabled to selectively throttle:

at least one secondary reverse link carrier by throttling one or more of pilot and data channel powers; and then, if sufficient power amplifier headroom is not provided, said means for selectively throttling power is operatively enabled to selectively throttle a primary reverse link carrier by:

throttling at least one overhead channel on said primary reverse link carrier until there is sufficient power amplifier headroom or the at least one data rate control channel power has been throttled down; and then, if sufficient power amplifier headroom is not provided, throttling one or more of the pilot and data channel powers until there is sufficient power amplifier headroom.

30. The apparatus for throttling power over a reverse link according to claim 21, wherein responsive to said throttling order said means for selectively throttling power is operatively enable to selectively throttle at least one secondary reverse link carrier by:

throttling one or more of pilot, data, and reverse rate indicator channel powers on a first secondary carrier; then, if sufficient power amplifier headroom is not provided, throttling power for a data source control down to a default level on a second secondary carrier; then, if sufficient power amplifier headroom is not provided, for throttling power for one or more of the data and reverse rate indicator channel powers on said second secondary carrier until there is sufficient power amplifier headroom or the data and reverse rate indicator channel powers have been throttled down; then, if sufficient power amplifier headroom is not provided, throttling power for at least one data rate control channel on said second secondary carrier until there is sufficient power amplifier headroom or the at least one data rate control channel power has been throttled down; then, if sufficient power amplifier headroom is not provided, throttling power for at least one acknowledgement channel on said second secondary carrier until there is sufficient power amplifier headroom or the acknowledgement channel power has been throttled down; and then, if sufficient power amplifier headroom is not provided, throttling power for at least one pilot channel and said data source control channel on said second secondary carrier until there is sufficient power amplifier headroom or the at least one pilot and the data source control channel powers have been throttled down.

31. The apparatus for throttling power over a reverse link according to claim 21, wherein responsive to said throttling order said means for selectively throttling power is operatively enabled to selectively throttle at least one secondary reverse link carrier before throttling power of said primary reverse link carrier, wherein throttling power of said at least one secondary reverse link carrier comprises:

throttling one or more of pilot, data, and reverse rate indicator channel powers on a first secondary carrier; then, if sufficient power amplifier headroom is not provided, throttling power for a data source channel on a second secondary carrier; then, if sufficient power amplifier headroom is not provided, throttling power for one or more of the data and reverse rate indicator channel powers on said second secondary carrier; then, if sufficient power amplifier headroom is not provided, throttling power for at least one data rate control channel on said second secondary carrier; then, if sufficient power amplifier headroom is not provided, throttling power for at least one acknowledgement channel on said second secondary carrier; then, if sufficient power amplifier headroom is not provided, throttling power for at least one pilot channel and said data source channel on said second secondary carrier; and wherein throttling power of said primary reverse link carrier comprises:

throttling a data source control channel power down to a default level;

then, if sufficient power amplifier headroom is not provided, throttling power for at least one data rate control channel on said primary reverse link carrier until there is sufficient power amplifier headroom or the at least one data rate control channel power has been throttled down; then, if sufficient power amplifier headroom is not provided, throttling power for at least one acknowledgment channel on said primary reverse link carrier until there is sufficient power amplifier headroom or said at least one acknowledgment channel power has been throttled down; and then, if sufficient power amplifier headroom is not provided, throttling one or more of the pilot, data, reverse rate indicator and said data source control channel powers until there is sufficient power amplifier headroom.

32. The apparatus for throttling power over a reverse link according to claim 21, wherein responsive to said throttling order said means for selectively throttling power is operatively enabled to selectively throttle at least one secondary reverse link carrier by:

throttling one or more pilot and data channel powers on a first secondary carrier; then, if sufficient power amplifier headroom is not provided, throttling power for one or more data channel powers on a second secondary carrier; and then, if sufficient power amplifier headroom is not provided, throttling power for at least one overhead channel on said second secondary carrier.

33. The apparatus for throttling power over a reverse link according to claim 21, wherein responsive to said throttling order said means for selectively throttling power is operatively enabled to selectively throttle at least one secondary reverse link carrier by:

throttling one or more pilot and data channel powers on a first secondary carrier; then, if sufficient power amplifier headroom is not provided, throttling power for one or more of data channel powers on a second secondary carrier; then, if sufficient power amplifier headroom is not provided, throttling power for at least one overhead channel on said second secondary carrier; and wherein responsive to said throttling order said means for selectively throttling power is operatively enabled to selectively throttle a primary reverse link carrier by:

throttling power for at least one overhead channel on said primary reverse link carrier until there is sufficient power amplifier headroom or the at least one data rate control channel power has been throttled down; and then, if sufficient power amplifier headroom is not provided, throttling one or more of the pilot and data channel powers until there is sufficient power amplifier headroom.

34. A method of throttling power over a reverse link in an access terminal, comprising:

providing at least one signal from a throttle control unit to a transmit circuit having a power amplifier used in both single carrier and multi-carrier operations, said at least one signal being based, at least in part, on one or more throttle rules establishing a throttling order; and with said transmit circuit, in response to said at least one signal, selectively throttling power of one or more portions of an RF signal that is input to said power amplifier to provide sufficient power amplifier headroom for said power amplifier.

35. The method of throttling power over a reverse link in an access terminal according to claim 34, wherein said reverse link comprises a single carrier and comprising, with said transmit circuit, in response to said at least one signal:

throttling power for at least one overhead channel on said reverse link until there is sufficient power amplifier headroom or at least one data rate control channel power has been throttled down; and then, if sufficient power amplifier headroom is not provided, throttling one or more of a pilot and data channel powers until there is sufficient power amplifier headroom.

36. The method of throttling power over a reverse link in an access terminal according to claim 34, wherein said reverse link comprises a single carrier and comprising, with said transmit circuit, in response to said at least one signal:

throttling a data source control channel power down to a default level; then, if sufficient power amplifier headroom is not provided, throttling power for at least one data rate control channel on said reverse link carrier until there is sufficient power amplifier headroom or the at least one data rate control channel power has been throttled down; then, if sufficient power amplifier headroom is not provided, throttling power for at least one acknowledgment channel on said reverse link carrier until there is sufficient power amplifier headroom or said at least one acknowledgment channel power has been throttled down; and then, if sufficient power amplifier headroom is not provided, throttling one or more of the pilot, data, reverse rate indicator and said data source control channel powers until there is sufficient power amplifier headroom.

37. The method of throttling power over a reverse link in an access terminal according to claim 34, wherein said reverse link comprises multiple carriers, and comprising, with said transmit circuit, in response to said at least one signal:

throttling power of at least one secondary reverse link carrier; and then, if sufficient power amplifier headroom is not provided, throttling power of a primary reverse link carrier.

38. The method of throttling power over a reverse link in an access terminal according to claim 34, wherein said one or more overhead channels comprises one or more of the following channels: a data source control channel, a data rate control channel, an acknowledgment channel, a pilot channels and a reverse rate indicator channel.

39. The method of throttling power over a reverse link in an access terminal according to claim 34, comprising, with said transmit circuit, in response to said at least one signal:
   throttling at least one traffic channel.

40. The method of throttling power over a reverse link in an access terminal according to claim 34, comprising, with said transmit circuit, in response to said at least one signal:
   throttling at least one pilot channel.

41. The method of throttling power over a reverse link in an access terminal according to claim 34, comprising, with said transmit circuit, in response to said at least one signal:
   throttling at least one traffic channel and at least one pilot channel.

42. The method of throttling power over a reverse link in an access terminal according to claim 37, wherein said throttling power of said at least one secondary reverse link carrier comprises:
   throttling one or more of pilot, data, and reverse rate indicator channel powers.

43. The method of throttling power over a reverse link in an access terminal according to claim 37, comprising, with said transmit circuit, in response to said at least one signal throttling power of said at least one secondary reverse link carrier before throttling power of said primary reverse link carrier,
   wherein said throttling power of at least one secondary reverse link in an access terminal carrier comprises throttling one or more of pilot, data, and reverse rate indicator channel powers; and
   comprising, with said transmit circuit, in response to said at least one signal throttling power of a primary reverse link carrier according to a sequence comprising:
      throttling a data source control channel power down to a default level; then if sufficient power amplifier headroom is not provided,
      throttling power for at least one data rate control channel on said reverse link carrier until there is sufficient power amplifier headroom or the at least one data rate control channel power has been throttled down; then, if sufficient power amplifier headroom is not provided,
      throttling power for at least one acknowledgment channel on said reverse link carrier until there is sufficient power amplifier headroom or said at least one acknowledgment channel power has been throttled down; and then, if sufficient power amplifier headroom is not provided,
      throttling one or more of the pilot, data, reverse rate indicator and said data source control channel powers until there is sufficient power amplifier headroom.

44. The method of throttling power over a reverse link in an access terminal according to claim 37, comprising, with said transmit circuit, in response to said at least one signal throttling power of at least one secondary reverse link carrier by:
   throttling one or more of pilot and data channel powers.

45. The method of throttling power over a reverse link in an access terminal according to claim 37, comprising, with said transmit circuit, in response to said at least one signal:
   throttling said power of at least one secondary reverse link in an access terminal carrier by throttling one or more of pilot and data channel powers; and
   throttling power of a primary reverse link carrier by:
      throttling power for at least one overhead channel on said primary reverse link carrier until there is sufficient power amplifier headroom or the at least one data rate control channel power has been throttled down; and then, if sufficient power amplifier headroom is not provided,
      throttling one or more of the pilot and data channel powers until there is sufficient power amplifier headroom.

46. The method of throttling power over a reverse link in an access terminal according to claim 37, comprising, with said transmit circuit, in response to said at least
   one signal throttling said power of at least one secondary reverse link carrier by:
   throttling one or more of pilot, data, and reverse rate indicator channel powers on a first secondary carrier; then, if sufficient power amplifier headroom is not provided,
   throttling power for a data source control down to a default level on a second secondary carrier; then, if sufficient power amplifier headroom is not provided,
   throttling power for one or more of the data and reverse rate indicator channel powers on said second secondary carrier until there is sufficient power amplifier headroom or the data and reverse rate indicator channel powers have been throttled down; then, if sufficient power amplifier headroom is not provided,
   throttling power for at least one data rate control channel on said second secondary carrier until there is sufficient power amplifier headroom or the at least one data rate control channel power has been throttled down; then, if sufficient power amplifier headroom is not provided,
   throttling power for at least one acknowledgement channel on said second secondary carrier until there is sufficient power amplifier headroom or the acknowledgement channel power has been throttled down; and then, if sufficient power amplifier headroom is not provided,
   throttling power for at least one pilot channel and said data source control channel on said second secondary carrier until there is sufficient power amplifier headroom or the at least one pilot and the data source control channel powers have been throttled down.

47. The method of throttling power over a reverse link in an access terminal according to claim 37, comprising, with said transmit circuit, in response to said at least one signal throttling power of said at least one secondary reverse link carrier before throttling power of said primary reverse link carrier,
   wherein throttling power of said at least one secondary reverse link carrier comprises;
      throttling one or more of pilot, data, and reverse rate indicator channel powers on a first secondary carrier; then, if sufficient power amplifier headroom is not provided,
      throttling power for a data source channel on a second secondary carrier; then, if sufficient power amplifier headroom is not provided,
      throttling power for one or more of the data and reverse rate indicator channel powers on said second secondary carrier; then, if sufficient power amplifier headroom is not provided,
      throttling power for at least one data rate control channel on said second secondary carrier; then, if sufficient power amplifier headroom is not provided,
      throttling power for at least one acknowledgement channel on said second secondary carrier; then, if sufficient power amplifier headroom is not provided,
      throttling power for at least one pilot channel and said data source channel on said second secondary carrier; and
   wherein throttling power of said primary reverse link carrier comprises:
      throttling a data source control channel power down to a default then if sufficient power amplifier headroom is not provided, throttling power for at least one data rate control channel on said primary reverse link carrier until there is sufficient power amplifier headroom or the at least one data rate control channel power has been throttled down; then, if sufficient power amplifier headroom is not provided, throttling power for at least one acknowledgment channel on said primary reverse link carrier until there is sufficient power amplifier headroom or said at least one acknowledgment channel power has been throttled down; and then, if sufficient power amplifier headroom is not provided, throttling one or more of the pilot, data, reverse rate indicator and said data source control channel powers until there is sufficient power amplifier headroom.

48. The method of throttling power over a reverse link in an access terminal according to claim 34, comprising, with said transmit circuit, in response to said at least one signal throttling power of at least one secondary reverse link carrier by:

throttling one or more pilot and data channel powers on a first secondary carrier; then if sufficient power amplifier headroom is not provided, throttling power for one or more data channel powers on a second secondary carrier; and then, if sufficient power amplifier headroom is not provided, throttling power for at least one overhead channel on said second secondary carrier.

49. The method of throttling power over a reverse link in an access terminal according to claim 34, comprising, with said transmit circuit, in response to said at least one signal throttling power of at least one secondary reverse link carrier by:

throttling one or more pilot and data channel powers on a first secondary carrier; then, if sufficient power amplifier headroom is not provided, throttling power for one or more of data channel powers on a second secondary carrier; then, if sufficient power amplifier headroom is not provided, throttling power for at least one overhead channel on said second secondary carrier; and wherein throttling power of a primary reverse link carrier comprises:

throttling power for at least one overhead channel on said primary reverse link carrier until there is sufficient power amplifier headroom or the at least one data rate control channel power has been throttled down; and then, if sufficient power amplifier headroom is not provided, throttling one or more of the pilot and data channel powers until there is sufficient power amplifier headroom.

50. The access terminal according to claim 1, wherein said one or more portions of said RF signal are associated with one or more carriers and comprise one or more overhead channels, one or more data channels, and/or one or more pilot channels.

51. The apparatus according to claim 18, wherein said one or more portions of said RF signal are associated with one or more carriers and comprise one or more overhead channels, one or more data channels, and/or one or more pilot channels.

52. The method according to claim 34, wherein said one or more portions of said RF signal are associated with one or more carriers and comprise one or more overhead channels, one or more data channels, and/or one or more pilot channels.

\* \* \* \* \*